US011108442B1

(12) United States Patent
Tian et al.

(10) Patent No.: US 11,108,442 B1
(45) Date of Patent: Aug. 31, 2021

(54) CALIBRATION AND IMPLICIT SOUNDING USING MULTI USER MULTIPLE INPUT MULTIPLE OUTPUT TRANSMISSIONS

(71) Applicant: QUALCOMM Incorporated, San Diego, CA (US)

(72) Inventors: Bin Tian, San Diego, CA (US); Lin Yang, San Diego, CA (US); Sameer Vermani, San Diego, CA (US); Lochan Verma, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/506,936

(22) Filed: Jul. 9, 2019

Related U.S. Application Data

(60) Provisional application No. 62/701,397, filed on Jul. 20, 2018.

(51) Int. Cl.
*H04B 7/04* (2017.01)
*H04B 7/0452* (2017.01)
*H04L 25/02* (2006.01)
*H04B 7/0417* (2017.01)
*H04B 17/12* (2015.01)
*H04B 7/06* (2006.01)

(52) U.S. Cl.
CPC ......... *H04B 7/0452* (2013.01); *H04B 7/0417* (2013.01); *H04B 17/12* (2015.01); *H04L 25/0204* (2013.01); *H04B 7/0617* (2013.01); *H04B 7/0634* (2013.01)

(58) Field of Classification Search
CPC .. H04B 7/0452; H04B 7/0417; H04B 7/0634; H04B 7/0617; H04B 17/12; H04L 25/0204
See application file for complete search history.

(56) References Cited

U.S. PATENT DOCUMENTS

| | | | |
|---|---|---|---|
| 7,656,965 B2 * | 2/2010 | Shapira | H04L 25/0206 375/299 |
| 7,672,400 B2 | 3/2010 | Shapira et al. | |
| 9,031,180 B2 * | 5/2015 | Rahul | H04L 27/2691 375/356 |
| 9,094,267 B2 * | 7/2015 | Cariou | H04L 27/2601 |
| 9,253,767 B2 * | 2/2016 | Wang | H04L 5/0094 |
| 9,876,543 B2 * | 1/2018 | Alexander | H04B 7/0417 |
| 9,936,488 B2 * | 4/2018 | Seok | H04L 1/0025 |
| 10,148,330 B2 * | 12/2018 | Jiang | H04B 7/0617 |
| 10,349,388 B2 * | 7/2019 | Chun | H04W 4/70 |
| 10,412,769 B2 * | 9/2019 | Cherian | H04W 72/0406 |

(Continued)

*Primary Examiner* — Siu M Lee
(74) *Attorney, Agent, or Firm* — Holland & Hart LLP

(57) ABSTRACT

Methods, systems, and devices for wireless communication are described. A wireless device may determine that a channel is reciprocal and perform an implicit sounding process. During the implicit sounding process, the wireless device may estimate the uplink channel by measuring a first uplink multi-user multiple input multiple output (MU-MIMO) transmission. The wireless devices may then update the uplink channel estimation based by measuring a second MU-MIMO transmission that is received after a downlink transmission from the wireless device. Based on the updated uplink channel estimation, the wireless device may send a beamformed MU-MIMO transmission to a number of other wireless devices.

24 Claims, 15 Drawing Sheets

(56) References Cited

U.S. PATENT DOCUMENTS

| | | | | |
|---|---|---|---|---|
| 2007/0206504 A1* | 9/2007 | Koo | ............... | H04B 7/0408 |
| | | | | 370/245 |
| 2011/0273977 A1* | 11/2011 | Shapira | ............ | H04B 7/0617 |
| | | | | 370/208 |
| 2012/0269183 A1* | 10/2012 | Sohn | ............ | H04L 1/06 |
| | | | | 370/338 |
| 2013/0188630 A1* | 7/2013 | Song | ............ | H04L 1/1671 |
| | | | | 370/338 |
| 2014/0247746 A1* | 9/2014 | You | ............ | H04W 24/06 |
| | | | | 370/252 |
| 2014/0308954 A1* | 10/2014 | Wang | ............ | H04W 36/165 |
| | | | | 455/436 |
| 2015/0071272 A1* | 3/2015 | Vermani | ............ | H04B 7/0621 |
| | | | | 370/338 |
| 2015/0117322 A1* | 4/2015 | McGrath | ............ | H04W 72/00 |
| | | | | 370/329 |
| 2016/0242195 A1* | 8/2016 | Kwon | ............ | H04L 5/0037 |
| 2016/0262051 A1* | 9/2016 | Merlin | ............ | H04B 7/0643 |
| 2016/0330047 A1* | 11/2016 | Seok | ............ | H04L 5/0057 |
| 2016/0330732 A1* | 11/2016 | Moon | ............ | H04B 7/0617 |
| 2017/0245193 A1* | 8/2017 | Zhang | ............ | H04W 64/00 |
| 2018/0092099 A1* | 3/2018 | Ishiguro | ............ | H04W 84/12 |
| 2018/0359761 A1* | 12/2018 | Chun | ............ | H04L 5/0094 |
| 2019/0159207 A1* | 5/2019 | Chen | ............ | H04L 5/005 |
| 2019/0207733 A1* | 7/2019 | Tang | ............ | H04L 5/006 |

* cited by examiner

CALIBRATION AND IMPLICIT SOUNDING USING MULTI USER MULTIPLE INPUT MULTIPLE OUTPUT TRANSMISSIONS

CROSS REFERENCE

The present Application for patent claims the benefit of U.S. Provisional Patent Application No. 62/701,397 by TIAN et al., entitled "CALIBRATION AND IMPLICIT SOUNDING USING MULTI-USER MULTIPLE INPUT MULTIPLE OUTPUT TRANSMISSIONS," filed Jul. 20, 2018, assigned to the assignee hereof, and expressly incorporated herein.

BACKGROUND

The following relates to wireless communications, and more specifically to calibration and implicit sounding using multi-user multiple input multiple output (MU-MIMO) transmissions.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include AP that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the STAs, and the UL (or reverse link) may refer to the communication link from the STAs to the AP.

SUMMARY

An access point (AP) may perform an implicit sounding process that uses multi-user multiple input multiple output (MU-MIMO) transmissions. To begin the sounding process, the AP may transmit a trigger message to multiple wireless devices (e.g., STAs or APs). The trigger message may instruct the wireless devices to transmit uplink MU-MIMO packets to the AP. The AP may estimate the uplink channel based on measurements of the uplink MU-MIMO packets. The AP may then receive additional uplink MU-MIMO packets that include data for the AP (e.g., feedback data, such as block acknowledgements (ACKs), for a MU-MIMO transmission from the AP). The AP may update the uplink channel estimation based on measuring the additional MU-MIMO packets. Upon updating the channel estimation, the AP may perform a MU-MIMO downlink transmission that is precoded based on the channel estimation.

Prior to performing the implicit sounding process, the AP may perform a calibration process. To begin the calibration process, the AP may transmit a null data packet announcement (NDPA) to multiple wireless devices. The NDPA may indicate that a downlink null data packet (NDP) is forthcoming and notify a subset of STAs that they have been selected by the AP to assist with the calibration process (e.g., by measuring the channel using the NDP). After transmitting the NDP, the AP may send a trigger frame to request that the STAs use UL MU MIMO to send back reports that convey measurement information for the downlink channels between the AP and the wireless devices. The AP may measure the uplink channels from the UL MU MIMO transmissions from these STA. Based on the measurement information for the uplink and downlink channels, the AP may compute channel response matrices for the uplink and downlink channels. Upon determining from the channel response matrices that there is a mismatch between the responses of its transmit and receive chains, the AP may correct the transmit chain so that its response matches that of the receive chain or use this mismatch information in future beamforming matrix generation.

A method of wireless communication at a wireless device is described. The method may include: transmitting a trigger message to a plurality of wireless devices, the trigger message prompting at least a first MU-MIMO transmission from the plurality of wireless devices; receiving the first MU-MIMO transmission from the plurality of wireless devices in response to the trigger message; performing a second MU-MIMO transmission to the plurality of wireless devices, where the second MU-MIMO transmission is beamformed according to a channel estimate that is based at least in part on the first MU-MIMO transmission; updating the channel estimate based at least in part on at least a third MU-MIMO transmission received after the second MU-MIMO transmission; and performing a fourth MU-MIMO transmission to the plurality of wireless devices based at least in part on the updated channel estimate.

An apparatus for wireless communication at a wireless device is described. The apparatus may include a first interface, a second interface, and a wireless modem configured to: output a trigger message over the first interface for transmission to a plurality of wireless devices, the trigger message prompting at least a first MU-MIMO transmission from the plurality of wireless devices; obtain over the second interface the first MU-MIMO transmission received from the plurality of wireless devices in response to the trigger message; perform a second MU-MIMO transmission to the plurality of wireless devices, where the second MU-MIMO transmission is beamformed according to a channel estimate that is based at least in part on the first MU-MIMO transmission; update the channel estimate based at least in part on at least a third MU-MIMO transmission received after the second MU-MIMO transmission; and perform a fourth MU-MIMO transmission to the plurality of wireless devices based at least in part on the updated channel estimate.

Another apparatus for wireless communication at a wireless device is described. The apparatus may include: means for transmitting a trigger message to a plurality of wireless devices, the trigger message prompting at least a first MU-MIMO transmission from the plurality of wireless devices; means for receiving the first MU-MIMO transmission from the plurality of wireless devices in response to the trigger message; means for performing a second MU-MIMO transmission to the plurality of wireless devices, where the second MU-MIMO transmission is beamformed according to a channel estimate that is based at least in part on the first MU-MIMO transmission; means for updating the channel estimate based at least in part on at least a third MU-MIMO transmission received after the second MU-MIMO transmission; and means for performing a fourth MU-MIMO transmission to the plurality of wireless devices based at least in part on the updated channel estimate.

A non-transitory computer-readable medium storing code for wireless communication at a wireless device is described. The code may include instructions executable by a processor to cause the wireless device to: transmit a trigger message to a plurality of wireless devices, the trigger message prompting at least a first MU-MIMO transmission from the plurality of wireless devices; receive the first MU-MIMO transmission from the plurality of wireless devices in response to the trigger message; perform a second MU-MIMO transmission to the plurality of wireless devices, where the second MU-MIMO transmission is beamformed according to a channel estimate that is based at least in part on the first MU-MIMO transmission; update the channel estimate based at least in part on at least a third MU-MIMO transmission received after the second MU-MIMO transmission; and perform a fourth MU-MIMO transmission to the plurality of wireless devices based at least in part on the updated channel estimate.

Some examples of the method, apparatuses, and non-transitory computer-readable medium described herein may further include operations, features, means, or instructions for performing a calibration process with at least a second wireless device of the set of wireless devices, where the second MU-MIMO transmission occurs after the calibration process.

Some examples of the method, apparatuses, and non-transitory computer-readable medium described herein may further include operations, features, means, or instructions for determining that the second wireless device supports a maximum of one spatial stream and selecting the second wireless device for the calibration process based on the determination.

In some examples of the method, apparatuses, and non-transitory computer-readable medium described herein, the calibration process may include operations, features, means, or instructions for transmitting, to the second wireless device, an NDPA including an indication of a number of antennas to use to measure a following NDP and to send measurement information for the NDP.

Some examples of the method, apparatuses, and non-transitory computer-readable medium described herein may further include operations, features, means, or instructions for selecting the second wireless device for the calibration process based on determining that the second wireless device is a non-legacy wireless station and where performing the calibration process includes receiving a report from the second wireless device, the report including a unitary matrix associated with a downlink channel or a channel response matrix for the downlink channel.

Some examples of the method, apparatuses, and non-transitory computer-readable medium described herein may further include operations, features, means, or instructions for computing a channel response matrix for the downlink channel based on the unitary matrix and generating a beamforming matrix based on the channel response matrix for the downlink channel.

Some examples of the method, apparatuses, and non-transitory computer-readable medium described herein may further include operations, features, means, or instructions for measuring a preamble of a MU-MIMO packet of the third MU-MIMO transmission, where the channel estimate may be updated based on the measurement.

In some examples of the method, apparatuses, and non-transitory computer-readable medium described herein, the second uplink MU-MIMO transmission includes a first block acknowledgment received for the second MU-MIMO transmission.

Some examples of the method, apparatuses, and non-transitory computer-readable medium described herein may further include operations, features, means, or instructions for receiving a second MU-MIMO block acknowledgement for the second MU-MIMO transmission, where the first and second MU-MIMO block acknowledgements may be received from different wireless devices of the set of wireless devices and updating the channel estimate based on the first and second MU-MIMO block acknowledgments.

In some examples of the method, apparatuses, and non-transitory computer-readable medium described herein, the first MU-MIMO transmission includes an NDP or a packet with a payload that includes downlink channel information.

In some examples of the method, apparatuses, and non-transitory computer-readable medium described herein, receiving the first MU-MIMO transmission may include operations, features, means, or instructions for receiving the first MU-MIMO transmission from a second wireless device of the set of wireless devices, receiving a fifth MU-MIMO transmission from a third wireless device of the set of wireless devices, where the trigger message synchronizes the first and fifth uplink MU-MIMO transmissions so that they overlap at least partially in time and frequency and estimating an uplink channel based on the first MU-MIMO transmission and the fifth MU-MIMO transmission.

In some examples of the method, apparatuses, and non-transitory computer-readable medium described herein, the trigger message includes an indication of a modulation and coding scheme (MCS) the set of wireless devices is to use and a target received signal strength indicator (RSSI).

A method of wireless communication at a first wireless device is described. The method may include: transmitting an NDPA to a set of wireless devices, the NDPA including an indication of a number of transmit and receive chains the set of wireless devices is to use for a calibration process with the first wireless device; transmitting an NDP to the set of wireless devices based at least in part on the NDPA; receiving, in response to the NDP, at least one report from the set of wireless devices, the at least one report including measurement information for a first channel between the first wireless device and a second wireless device in the set of wireless devices; determining measurement information for a second channel between the first wireless device and the second wireless device based at least in part on a preamble of the at least one report; and computing a channel response mismatch between a transmit chain and a receive chain of the first wireless device based at least in part on the measurement information for the first channel and the measurement information for the second channel.

An apparatus for wireless communication at a first wireless device is described. The apparatus may include a first interface, a second interface, and a wireless modem configured to: output an NDPA over the first interface for transmission to a set of wireless devices, the NDPA including an indication of a number of transmit and receive chains the set of wireless devices is to use for a calibration process with the first wireless device; output an NDP over the first interface for transmission to the set of wireless devices based at least in part on the NDPA; obtain over the second interface at least one report received from the set of wireless devices in response to the NDP, the at least one report including measurement information for a first channel between the first wireless device and at least a second wireless device in the set of wireless devices; determine measurement information for a second channel between the first wireless device and the second wireless device based at least in part on a preamble of the at least one report; and compute a channel response mismatch between a transmit chain and a receive chain of the first wireless device based at least in part on the measurement information for the first channel and the measurement information for the second channel.

Another apparatus for wireless communication at a first wireless device is described. The apparatus may include: means for transmitting an NDPA to a set of wireless devices, the NDPA including an indication of a number of transmit and receive chains the set of wireless devices is to use for a calibration process with the first wireless device; means for transmitting an NDP to the set of wireless devices based at least in part on the NDPA; means for receiving, in response to the NDP, at least one report from the set of wireless devices, the at least one report including measurement information for a first channel between the first wireless device and a second wireless device in the set of wireless devices; means for determining measurement information for a second channel between the first wireless device and the second wireless device based at least in part on a preamble of the at least one report; and means for computing a channel response mismatch between a transmit chain and a receive chain of the first wireless device based at least in part on the measurement information for the first channel and the measurement information for the second channel.

A non-transitory computer-readable medium storing code for wireless communication at a first wireless device is described. The code may include instructions executable by a processor to cause the first wireless device to: transmit an NDPA to a set of wireless devices, the NDPA including an indication of a number of transmit and receive chains the set of wireless devices is to use for a calibration process with the first wireless device; transmit an NDP to the set of wireless devices based at least in part on the NDPA; receive, in response to the NDP, at least one report from the set of wireless devices, the at least one report including measurement information for a first channel between the first wireless device and a second wireless device in the set of wireless devices; determine measurement information for a second channel between the first wireless device and the second wireless device based at least in part on a preamble of the at least one report; and compute a channel response mismatch between a transmit chain and a receive chain of the first wireless device based at least in part on the measurement information for the first channel and the measurement information for the second channel.

Some examples of the method, apparatuses, and non-transitory computer-readable medium described herein may further include operations, features, means, or instructions for transmitting, to the second wireless device, a trigger message indicating when to send the at least one report and indicating that the second wireless device may send the at least one report using MU-MIMO.

Some examples of the method, apparatuses, and non-transitory computer-readable medium described herein may further include operations, features, means, or instructions for computing a channel response matrix for the second channel based on the measurement information for the second channel and computing a channel response matrix for the first channel based on the measurement information for the first channel.

Some examples of the method, apparatuses, and non-transitory computer-readable medium described herein may further include operations, features, means, or instructions for computing a channel response mismatch between a transmit chain and a receive chain of the first wireless device based on the channel response matrices and adjusting one or more parameters of a transmit chain based on the channel response mismatch.

A method of wireless communication at a first wireless device is described. The method may include receiving an NDPA from a second wireless device, the NDPA including an indication of a number of chains the first wireless device is to use for a calibration process with the second wireless device, receiving an NDP using a set of chains based on the number of chains indicated in the NDPA, and transmitting, using the same set of chains, a report including measurement information for a channel between first wireless device and the second wireless device.

An apparatus for wireless communication at a first wireless device is described. The apparatus may include a first interface, a second interface, and a wireless modem configured to: obtain over the first interface an NDPA received from a second wireless device, the NDPA including an indication of a number of chains the first wireless device is to use for a calibration process with the second wireless device; obtain over the first interface an NDP received using a set of chains that is based at least in part on the number of chains indicated in the NDPA; and output, for transmission over the second interface using the same set of chains, a report including measurement information for a channel between first wireless device and the second wireless device.

Another apparatus for wireless communication at a first wireless device is described. The apparatus may include means for receiving an NDPA from a second wireless device, the NDPA including an indication of a number of chains the first wireless device is to use for a calibration process with the second wireless device, receiving an NDP using a set of chains based on the number of chains indicated in the NDPA, and transmitting, using the same set of chains, a report including measurement information for a channel between first wireless device and the second wireless device.

A non-transitory computer-readable medium storing code for wireless communication at a first wireless device is described. The code may include instructions executable by a processor to receive an NDPA from a second wireless device, the NDPA including an indication of a number of chains the first wireless device is to use for a calibration process with the second wireless device, receive an NDP using a set of chains based on the number of chains indicated in the NDPA, and transmit, using the same set of chains, a report including measurement information for a channel between the first wireless device and the second wireless device.

In some examples of the method, apparatuses, and non-transitory computer-readable medium described herein, the number of chains may be one.

Some examples of the method, apparatuses, and non-transitory computer-readable medium described herein may further include operations, features, means, or instructions for 1) receiving a trigger message indicating when to send the report and indicating that the first wireless device is send the report using MU-MIMO and 2) transmitting the report using MU-MIMO based on the trigger message.

Some examples of the method, apparatuses, and non-transitory computer-readable medium described herein may further include operations, features, means, or instructions for determining a unitary matrix associated with the channel, where the report includes the unitary matrix.

Some examples of the method, apparatuses, and non-transitory computer-readable medium described herein may further include operations, features, means, or instructions for computing a channel response matrix for the channel, where the report includes the channel response matrix.

DETAILED DESCRIPTION

Figure 1:
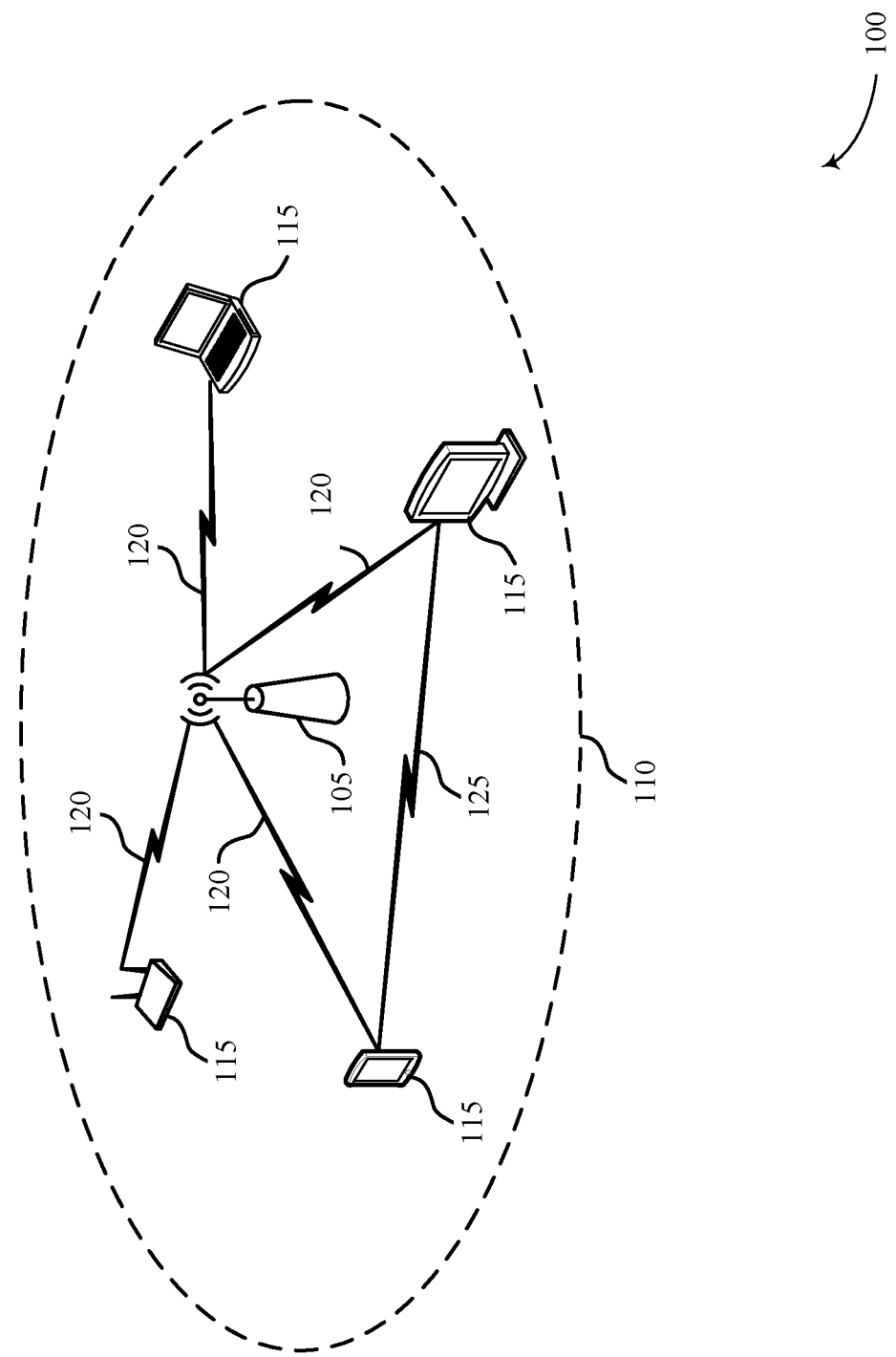
FIG. 1 illustrates an example of a wireless communications system that supports calibration and implicit sounding using MU-MIMO transmissions in accordance with aspects of the present disclosure.

In some cases, a wireless device, such as an access point (AP) may communicate with multiple stations (STAs) using multi-user multiple input multiple output (MU-MIMO) techniques, and the AP may use beamforming to steer the MU-MIMO transmissions to the STAs so that there is less interference to the signal targeted to each STA. To send beamformed MU-MIMO packets, the AP may gather information about the wireless channel between the AP and the STA(s). For example, the AP may use a sounding process to determine channel information for performing MU-MIMO beamformed communications. But some channel sounding processes (e.g., explicit sounding) may involve multiple packets being sent between the AP and a STA. These approaches may have substantial overhead, require complex processing at the STA, and, due to the overhead, may not be updated frequent enough to reflect short-term changes in channel conditions. As disclosed herein, an AP may use an implicit sounding process that reduces overhead, simplifies the STA's processing duties, and accounts for changes in the channel. Although described with reference to an AP and STA, the techniques described herein may be implemented by any combination of wireless devices, and role of each device may be filled by either an AP or STA.

Explicit sounding may refer to a sounding process that involves channel measurements in the same direction as a future transmission. In explicit sounding, an AP with multiple antennas sends a measurement signal with a number of spatial streams that is the same as its number of transmit chains/antennas so that a receiving STA can process the spatial streams and provide feedback for the channel information corresponding to all the transmit antennas. For example, an AP that has sixteen antennas may send sixteen long training fields (LTFs) in a null data packet (NDP), encoded using 16 spatial streams. The STA that receives the NDP may process all the LTFs to estimate the downlink channel from all sixteen transmit antennas, then send back a beamforming report with the encoded channel information for all sixteen antennas. So explicit sounding may have significant overhead (which linearly grows as number of transmit antennas) and may involve complex processing at the STA (e.g., because in WiFi, singular-value decomposition (SVD) processing of the estimate downlink channel is used to generate feedback report).

According to the techniques described herein, an AP may reduce overhead and STA processing by performing implicit sounding using MU-MIMO. Implicit sounding may refer to a sounding process that involves channel measurements in the opposite direction as a future transmission. In MU-MIMO implicit sounding, an AP may prompt multiple STAs to send a MU-MIMO packet to the AP. Because the AP is using MU-MIMO techniques, the AP may send a single prompt (also referred to as a MU-MIMO trigger) to the STAs, which reduces overhead (compared to the downlink explicit sounding sequence). Once the AP receives the uplink MU-MIMO packets from the STAs, the AP can estimate the channel by measuring known training symbols (e.g., high-efficiency long training field (HE-LTF) symbols) included in the preamble of the packets.

But a channel may change over time, rendering the AP's initial channel estimate inaccurate. According to the techniques described herein, an AP may update a channel estimate by measuring the preambles of packets used to convey acknowledgement data (acknowledgements (ACKs) or negative acknowledgments (NACKs)) for downlink MU-MIMO transmissions from the AP. Thus, the ACKs (which may be referred to as block ACKs in the MU-MIMO context) may not only indicate the reception status of a downlink transmission, but also enable the AP to refresh its channel estimate. Put another way, the AP may reduce sounding overhead by using the block ACKs to obtain channel information for MU-MIMO and beamforming techniques.

Unlike explicit sounding, implicit sounding relies upon reciprocity between the uplink channel and the downlink channel. The downlink channel may include the transmit chains of the AP, the over-the-air (OTA) downlink channel, and the receive chains of the STAs involved in the sounding process. The uplink channel may include the transmit chains of the STAs, the OTA uplink channel, and the receive chains of the AP. The OTA uplink and downlink channels are reciprocal due to physics. But for implicit sounding to work properly, the transmit and receive chains of the AP must also be reciprocal (e.g., have the same responses).

According to the techniques described herein, an AP may ensure chain reciprocity by performing a calibration process using MU-MIMO. The calibration process may provide information about the responses of the AP's transmit and receive chains so that the AP can adjust the transmit chain to match the response of the receive chain (or the AP may use the mismatch information in generating a beamforming/precoding matrix for DL MU-MIMO). The calibration process may involve the AP prompting one or more STAs to provide downlink channel information (e.g., derived from analysis of a downlink MU-MIMO NDP). However, legacy STAs may not be configured to send all of the information necessary for the AP to construct the complete channel response (H), which may be needed to perform the calibration. For example, the channel information provided by the STAs may only contain information on S and V. Here, $H=USV^H$ is the SVD of the channel H. Thus, absence of the unitary matrix (U) may prevent the AP from being able to construct the complete channel response H.

An AP may address this issue by using one or more of the following techniques. First, the AP may limit the calibration process to STAs that have only one transmit chain and the same one receive chain. Since the unitary matrix U degrades to a number when a STA uses a single transmit and receive chain, the AP can construct the complete channel response without the U matrix. The AP may determine which STAs have a single transmit and receive chain by referencing the number of supported spatial streams reported by each STA. This is because the number of supported spatial streams corresponds roughly with the number of transmit and receive chains. However, the correspondence may not be perfect (e.g., a STA could only support one spatial stream but have two antenna chains at its disposal), so the AP may confirm which STAs have single chains by evaluating the validity of the calibration result.

Second, the AP may instruct the participating STAs to only use a single chain during the calibration process (again, so the U matrix degrades to a number). For example, the AP may include a signaling bit in a null data packet announce (NDPA) packet that specifies that the STAs are to use the same chain for transmitting and receiving calibration packets. If a STA has multiple chains to select from, the STA may choose the strongest chain for the calibration.

Third, the AP may select non-legacy STAs to participate in the calibration process. Since non-legacy STAs may be configured to include the U matrix in the channel information report, the AP may be able to compute the complete channel response H without degrading U to a number. Alternatively, these non-legacy STAs may send the complete channel response H directly in the channel information report. Although described separately, the AP may use a combination of these techniques to perform the calibration process.

Features of the disclosure introduced above are further described herein in the context of a wireless communication system. Specific examples are then described of calibration processes that use MU-MIMO transmissions and implicit sounding processes that use MU-MIMO transmissions. These and other features of the disclosure are further illustrated by and described with reference to apparatus diagrams, system diagrams, and flowcharts that relate to MU-MIMO-based calibration and implicit sounding techniques. Although described with reference to an AP and STA, the techniques described herein are not limited to such a configuration and may be implemented by any combination of wireless devices serving in any of the described roles.

FIG. 1 illustrates a wireless local area network (WLAN) 100 (also known as a Wi-Fi network) configured in accordance with various aspects of the present disclosure. The WLAN 100 may include one or more wireless devices, such as an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a BSS or an ESS. The various STAs 115 in the network are able to communicate with one another through the AP 105. Also shown is a coverage area 110 of the AP 105, which may represent a BSA of the WLAN 100. An extended network station (not shown) associated with the WLAN 100 may be connected to a wired or wireless distribution system that may allow multiple APs 105 to be connected in an ESS. According to the techniques described herein, the AP 105 may use MU-MIMO transmissions to perform calibration and implicit sounding processes with the STAs 115.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

An AP 105 may communicate with a STA 115 via uplink and downlink. In some examples, uplink transmissions may refer to transmissions from the STA 115 to the AP 105 and downlink transmissions may refer to transmissions from the AP 105 to the STA 115. In other examples, uplink communications may refer to communications in one direction (relative to a particular wireless device) and downlink communications may refer to communications in the opposite direction (relative to the same wireless device).

A number of communication techniques may be used for the uplink and downlink transmissions. For example, a wireless device (e.g., an AP 105 or STA 115) may implement beamforming in which the energy of a transmission is focused in a particular direction (e.g., towards another wireless device or a set of wireless devices). In some cases, multiple-input-multiple output (MIMO) techniques may be used for when the AP 105 and/or STA 115 involved in a communication include multiple antennas. In some cases, uplink and/or downlink multi-user MIMO (MU-MIMO) techniques may be used in which multiple streams of data are simultaneously communicated (e.g., from one wireless device to another) using multiple antennas and beamforming technology.

In downlink MU-MIMO, an AP 105 may simultaneously send multiple streams to multiple STAs 115 by taking advantage of spatial diversity in transmission resources and multiple antennas. In uplink MU-MIMO, the data transmissions of multiple STAs 115 may be coordinated so that they are simultaneously received at the AP 105 over multiple spatial streams. MU-MIMO techniques may also be used for communications between APs 105 or between STAs 115 (e.g., in peer-to-peer and/or master/slave communication scenarios).

In order to implement beamforming or MU-MIMO techniques, a wireless device such as an AP 105 may need to know information about the characteristics of the downlink and uplink channels (e.g., how the channel affects a packet, in terms of phase, amplitude, frequency, etc.). For example, the AP 105 may determine the properties of the downlink and uplink channels so that it can beamform (e.g., direct) the signals for STAs 115 so the signal intended for one STA does not severely interfere with the signal intended for another STA.

Determining the properties of a channel may also be referred to herein as estimating the channel. Channel estimation may be performed by an AP 105 or STA 115. For instance, an AP 105 may estimate a channel by obtaining information indicative of the impact a channel has on a packet during propagation. This information may be derived by measuring known training symbols within a sounding packet. For example, a device that receives a sounding packet may measure the long training field (LTF) symbols in the packet to determine the effects of the channel on the packet. According to the techniques described herein, an AP 105 may calculate an initial channel estimate using an uplink MU-MIMO transmission, then update the channel estimate using a block acknowledgement (ACK) transmission. In implicit sounding, an AP 105 may estimate an uplink channel by measuring uplink packets and may estimate the downlink channel by assuming (e.g., in implicit sounding) that the downlink channel is reciprocal to the uplink channel.

Two channels are reciprocal if the channel response and transmit chain response in the downlink direction match the channel response and receive chain response in the uplink direction. An AP 105 may employ a calibration process utilizing MU-MIMO to estimate the mismatch between the response of its receive chains and transmit chains. The AP 105 may take the mismatch into account of when beamforming downlink MU MIMO transmissions. During the calibration process, the AP 105 may send a null data packet (NDP) to a number of STA(s) for measurement. The NDPs include same number of LTFs as the number of transmission chains of the AP 105. When the STAs 115 report the downlink channel information derived from measuring the LTFs, the AP 105 may use the channel information to calculate correction matrices. These correction matrices may be applied at the transmitter (and/or the receiver) to correct for the amplitude and phase differences between the transmit and receive chains of the AP 105. Additionally, or alternatively, the correction matrices may be used in the beamforming matrix computation for the DL MU-MIMO transmission.

To perform the calibration process, an AP 105 may compute the complete channel response ($H_{UL}$) for the uplink channel and the complete channel response ($H_{DL}$) for the downlink channel. The complete channel response H for a channel may represented or computed as H=USV*, where U represents the unitary matrix, S represents the signal strength (e.g., signal-to-noise ratio (SNR)) in terms of Eigen values, and V represents the Eigen vectors of the channel response H (so V* may be the conjugate transpose, or Hermitian transpose, of V). Once the complete channel responses $H_{UL}$ and $H_{DL}$ are computed, the AP 105 may complete the calibration process using any number of methods, including the least squares calibration method.

While an AP 105 may be able to estimate the uplink channel H by measuring an uplink MU-MIMO transmission directly, the AP 105 may rely on a STA 115 to report downlink channel information in order to estimate the downlink channel. But in some cases, a STA 115 (e.g., a legacy STA) may provide only some of the parameters needed to compute $H_{DL}$. For example, the STA 115 may report S and V but not U. In such cases, the AP 105 may take actions that compensate for the lack of U. For example, because the U matrix degrades to a number when a single chain is used for transmitting and receiving, the AP 105 may select STAs 115 that only have (or use) a single chain for communication. Or the AP 105 may instruct STAs 115 to only use a single chain during the calibration process. Alternatively, the AP 105 may select non-legacy STAs that include the U matrix in their reports (in some cases, the non-legacy STAs may even include the entire downlink channel response $H_{DL}$ in their reports).

Although described from the perspective of an AP 105, the channel estimation and calibration techniques described herein may be performed by any wireless device, including a STA 115.

Figure 2:
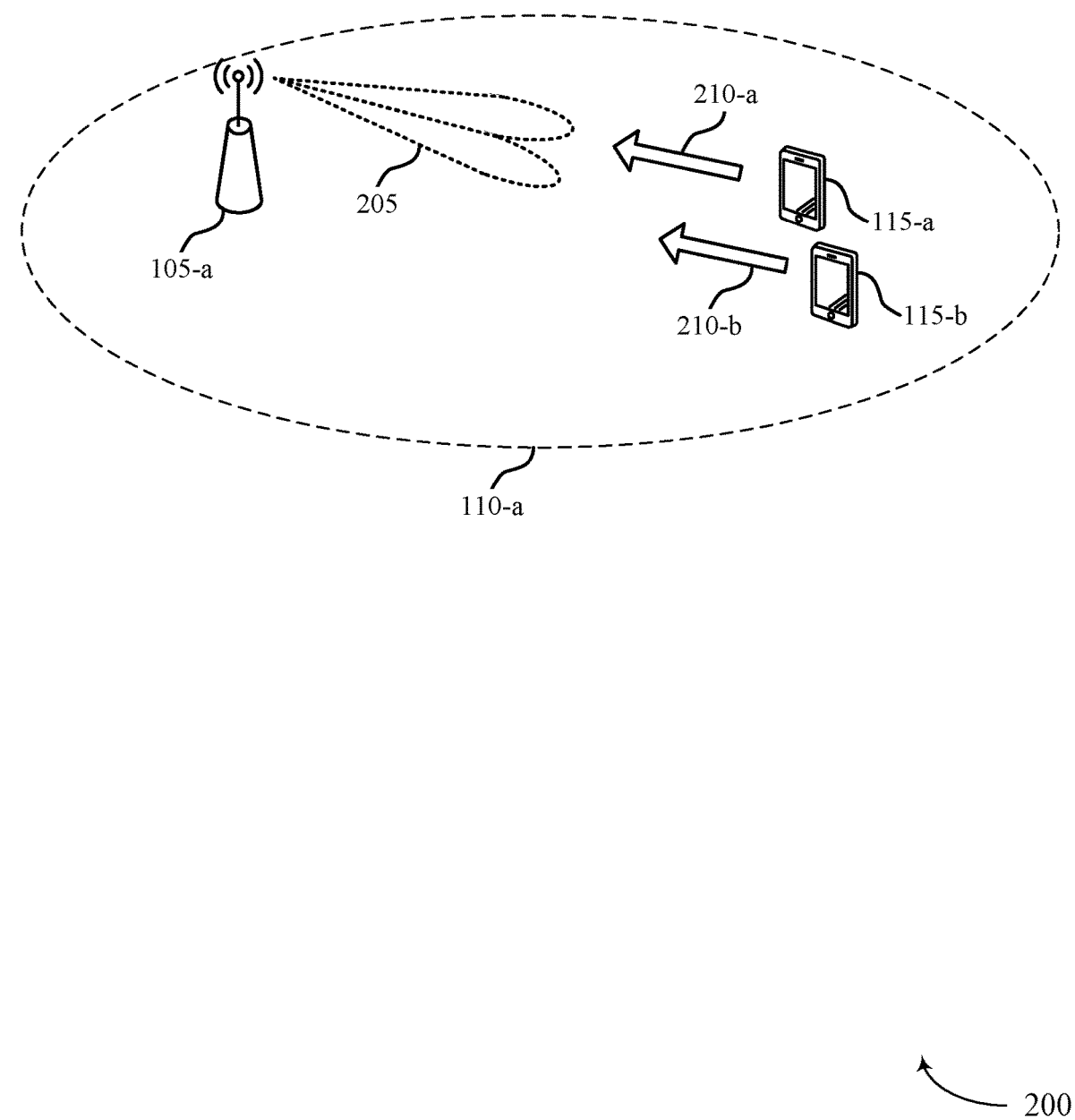
FIG. 2 illustrates an example of a wireless communications system that supports calibration and implicit sounding using MU-MIMO transmissions in accordance with aspects of the present disclosure.

FIG. 2 illustrates an example of a wireless communications system 200 for implicit sounding and calibration using MU-MIMO transmissions. Wireless communications system 200 may include AP 105-*a*, STA 115-*a*, and STA 115-*b*, which may be examples of the corresponding devices described with reference to FIG. 1. AP 105-*a* may communicate with other wireless devices inside coverage area 110-*a*. AP 105-*a* may communicate using a variety of techniques, including beamforming, single-user MIMO (SU-MIMO), and MU-MIMO. According to the techniques described herein, AP 105-*a* may calibrate its antenna chains before initiating an implicit sounding process. Although described in FIG. 2 as being performed by a certain configuration of wireless devices, the implicit sounding and calibration techniques described herein can be implemented by any configuration of wireless devices.

AP 105-*a* may communicate with STA 115-*b* and STA 115-*c* using MU-MIMO techniques. The AP 105-*a* may also use beamforming to send MU-MIMO transmissions. For example, AP 105-*a* may send a beamformed MU-MIMO transmission 205 to STA 115-*a* and STA 115-*b*. STAs 115 may also send uplink MU-MIMO transmissions (e.g., uplink MU-MIMO transmission 210-*a* and uplink MU-MIMO transmission 210-*b*) to AP 105. The uplink MU-MIMO transmissions 210 may be aligned in time and/or frequency (e.g., the uplink MU-MIMO transmissions 210 may be sent over the same time and/or frequency resources).

Prior to sending a beamformed transmission over a channel, AP 105-*a* may gather information about the channel. AP 105-*a* (as beamformer) may use the information, which may be referred to herein as channel information, to estimate the channel and determine a beamforming steering matrix that is used to direct transmissions towards the target device(s) (as beamformee(s)). The transmissions may be directed by applying weights to antennas within an antenna array so that constructive and destructive interference focuses the energy of the transmission in a particular direction.

According to the techniques described herein, AP 105-a may obtain channel information for MU-MIMO and beamforming via an implicit sounding process. The implicit sounding process may involve the exchange of MU-MIMO transmissions between the AP 105-a and one or more of the STAs 115. Prior to initiating the sounding process, the AP 105-a may perform a calibration process to match the response of its transmit and receive antenna chains (thus creating a reciprocal channel, given OTA channel reciprocity). A STA 115 that participates in the calibration and sounding processes may use the same set of transmit and receive chains for both processes.

Figure 3:
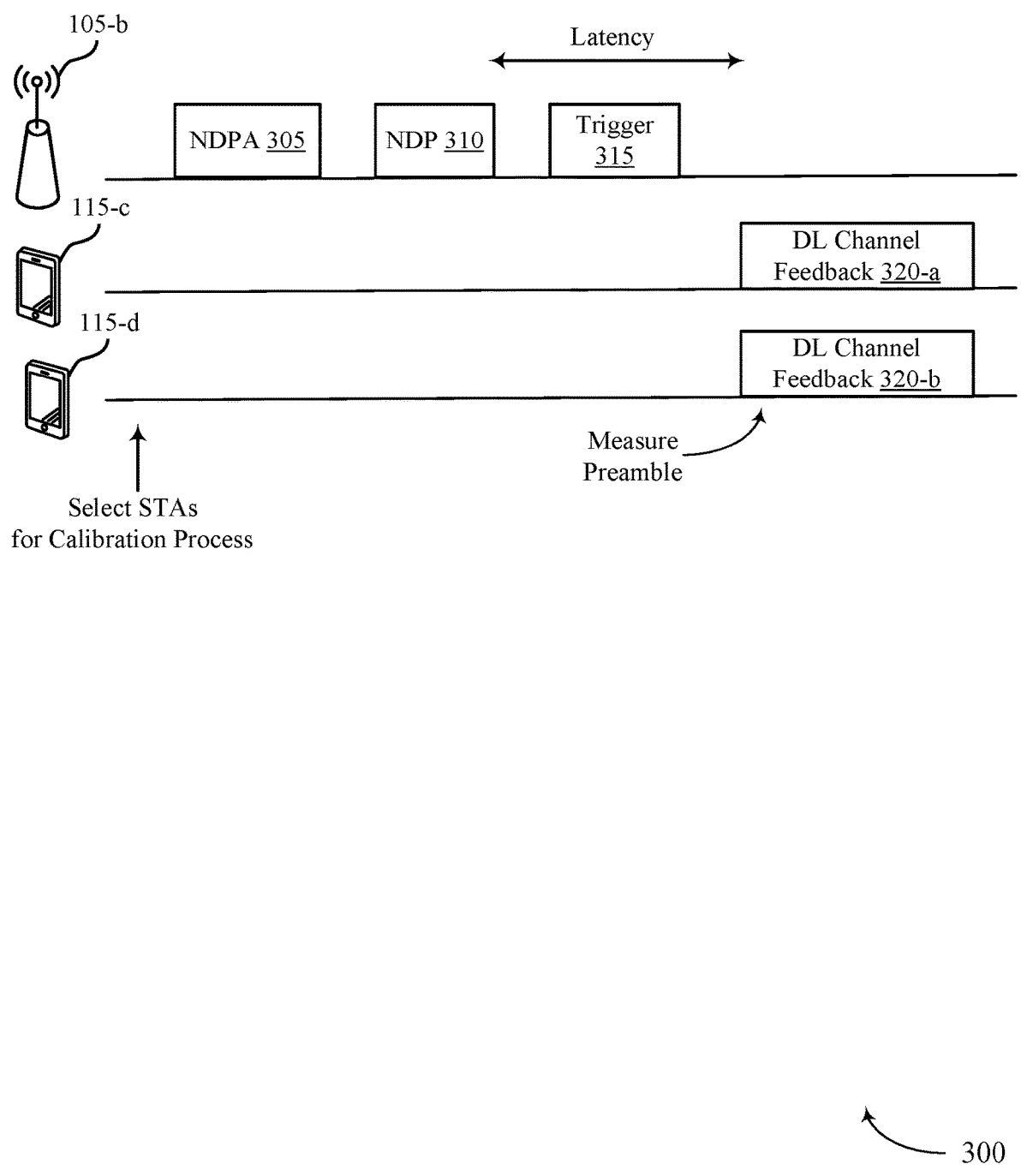
FIG. 3 illustrates an example of an over-the-air (OTA) calibration process that supports implicit sounding using MU-MIMO transmissions in accordance with aspects of the present disclosure.

FIG. 3 illustrates an example of an over-the-air (OTA) calibration process 300 that supports implicit sounding using MU-MIMO transmissions. OTA calibration process 300 may be performed by AP 105-b, and STA 115-c and STA 115-d may participate in the process. OTA calibration process 300 may be performed by AP 105-b before AP 105-b initiates an implicit sounding process using MU-MIMO techniques. The calibration process 300 may include a null data packet announcement (NDPA) 305, an NDP 310, a trigger message 315, and downlink channel feedback reports 320. Although described as being implemented by an AP 105 and two STAs 115, the calibration process 300 can be implemented by any combination of wireless devices with any wireless device serving in a given role. For example, the calibration process 300 may be implemented by a set of APs 105 or a set of STAs 115, or a different combination of APs 105 and STAs 115.

Prior to initiating calibration process 300, AP 105-b may select a set of wireless devices to participate in the process. For example, AP 105-b may select STA 115-c and STA 115-d to participate in the calibration process 300. The set of STAs may be selected from a larger set of candidate STAs within the coverage area of AP 105-b. AP 105-b may select the STAs so that AP 105-b is able to construct a complete channel response $H_{DL}$ for calibration purposes.

In one example, AP 105-b may select STAs 115 that only support communications over a single spatial stream. Because the number of supported spatial streams roughly corresponds to the number of transmit chains available to a STA 115, selecting STAs 115 that support a maximum of one spatial stream increases the likelihood that those STAs 115 are configured with a single chain for transmitting and receiving. Since the U matrix degrades to a number when a single chain is used for communication, the AP 105-b may compute the complete channel response $H_{DL}$ even if the STAs 115 are legacy STAs that do not include U in their reports (e.g., even if the reports only include some elements that make up the channel response, such as S and/or V). Thus, AP 105-b may compute the channel response mismatch between the transmission and receive chain of AP 105-b based on incomplete reports (e.g., reports that are missing at least one element that makes up $H_{DL}$).

But in some cases, a STA 115 that supports at most a single spatial stream may nevertheless be configured with multiple transmit and/or receive chains. In these cases, AP 105-b may use the information from the STA 115 to calculate S*V' and determine whether the STA 115 used multiple chains by evaluating the smoothness of the result. Alternatively, AP 105-b may use the STA 115 to perform a trial calibration and then determine whether the STA 115 used multiple chains based on the validity or accuracy of the calibration result. If either test indicates that the STA 115 used multiple chains, AP 105-b may remove the STA 115 from the calibration process and select a new STA 115 to take its place (e.g., based on its number of supported spatial streams). AP 105-b may reiterate this selection process until it has a set of STAs 115 that allows it to calculate the channel response $H_{DL}$.

In another example, AP 105-b may select non-legacy STAs 115 for the calibration process. Non-legacy STAs may be STAs that are configured to include the U matrix in their reports. A non-legacy STA may generate the U matrix from a singular-value decomposition (SVD) of the channel response associated with a downlink channel (e.g., the STA may determine U, S, and V by decomposing $H_{DL}$). Or a non-legacy STA may include the complete channel response matrix $H_{DL}$ in its report, as determined by the STA. Thus, AP 105-b may identify non-legacy STAs 115 and select them for the calibration process based on their non-legacy status. And AP 105-b may compute the channel response mismatch between the transmission and receive chain of AP 105-b based on complete reports (e.g., reports that either include $H_{DL}$ or all the components that make up $H_{DL}$).

In another example, AP 105-b may select STAs 115 (e.g., legacy STAs) and instruct them to use a single chain for the calibration process. For example, AP 105-b may indicate the number of antenna chains the STAs 115 are to use to a) measure the NDP 310 and b) transmit the report that includes measurement information for the NDP 310 (e.g., downlink channel feedback report 320).

After AP 105-b has selected a set of STAs 115 for the calibration process 300, AP 105-b may initiate the calibration process by transmitting NDPA 305 to STA 115-c and STA 115-d. NDPA 305 may secure the channel and identify the STAs 115 that are to participate in the calibration process 300. In some cases, the NDPA 305 includes an indication of the number of antennas (or antenna chains) a STA 115 is to use for the calibration process. For example, the NDPA 305 may indicate that the STAs 115 are to use x antennas (or antenna chains) to measure the NDP 310. The NDPA 305 may also indicate that the STAs 115 are to use the same x antennas (or chains) (e.g., the same set of antennas or chains) to send the downlink channel feedback reports 320. The NDPA 305 may be an SU transmission or an MU transmission.

Next, AP 105-b may transmit NDP 310, which may be constructed so that a receiver (e.g., a STA 115) can analyze orthogonal frequency division multiplexing (OFDM) training fields to calculate the downlink channel response. For example, the STAs 115 may calculate the complete channel response $H_{DL}$ based on measurements of the LTFs in the NDP 310. After transmitting the NDP 310, AP 105-b may transmit trigger message 315. Trigger message 315 may indicate when the STAs 115 are to send the downlink channel feedback reports 320. In some cases, trigger message 315 may also indicate that the STAs 115 are to send the downlink channel feedback reports 320 using uplink MU-MIMO. In some cases, trigger message 315 may synchronize transmissions of the downlink channel feedback reports 320. Trigger message 315 may also be referred to as a trigger frame.

In response to the trigger message 315, the STAs 115 may transmit the downlink channel feedback reports 320 to AP 105-b. For example, STA 115-c may transmit downlink channel feedback report 320-a and STA 115-d may transmit downlink channel feedback report 320-b. The STAs 115 may each use the same set of chains for communication during calibration process 300. For example, STA 115-c may (e.g., as instructed by AP 105-b) use a set of antenna chains for receiving NDP 310 and use the same set of antenna chains to transmit downlink channel feedback report 320-a. Similarly, STA 115-c may use a set of antenna chains for receiving NDP 310 and use the same set of antennas chains to transmit downlink channel feedback report 320-b.

The downlink channel feedback reports 320 may be uplink MU-MIMO transmissions and may include downlink channel information as determined from the measurements of NDP 310 (or the downlink channel feedback reports 320 may include the measurement information). In some cases, (e.g., when the STAs 115 are non-legacy STAs) the downlink channel feedback reports 320 may include the complete downlink channel response $H_{DL}$, or the components from which the channel response $H_{DL}$ is derived (e.g., U, S, and V). In other cases (e.g., when the STAs 115 are legacy STAs), the downlink channel feedback reports 320 may include only some of the components from which the channel response $H_{DL}$ is derived (e.g., V and S but not U). So, based on the measurement information in the downlink channel feedback reports 320, AP 105-b may obtain the complete downlink channel response $H_{DL}$. In some cases, the channel information from the downlink channel feedback reports 320 may be averaged to increase the calibration accuracy.

But AP 105-b cannot determine a response mismatch between its transmit and receive chains without the complete uplink channel response $H_{UL}$. To determine uplink channel response $H_{UL}$, AP 105-b may measure the preamble of the downlink channel feedback reports 320. Based on the measurement information, AP 105-b may construct uplink channel response $H_{UL}$, which it can then compare to downlink channel response $H_{DL}$ to determine any response mismatch between its transmit and receive chain(s) (e.g., any amplitude, frequency, or phase differences between the transmit and receive chains). Upon determining the mismatch, AP 105-b may calculate one or more correction matrices that can be applied at the transmitter to correct for the mismatch (e.g., AP 105-b may adjust one or more parameters of the transmit chain). Thus, AP 105-b may adjust one or more parameters of a transmit chain based at least in part on the channel response matric $H_{DL}$ and Additionally, or alternatively, AP 105-b may use the correction matrices in computing the beamforming matrix for future downlink MU-MIMO transmissions. Once the transmit chain has been corrected, AP 105-b can consider the channel a reciprocal channel and perform the implicit sounding techniques described herein.

Calibration process 300 may provide a more efficient calibration compared to other calibration processes because it uses the same uplink transmission (e.g., downlink channel feedback report 320) to determine both the downlink channel response $H_{DL}$ and the uplink channel response $H_{UL}$. Calibration process 300 may also provide a more accurate calibration than other calibration processes because the latency between downlink and uplink channel measurement may be reduced compared to other calibration processes. For example, because the measurements behind the channel response $H_{UL}$ occur shortly after the measurements behind $H_{DL}$, there is less time for the channel to change. Thus, the small time gap between NDP 310 and downlink channel feedback report 320 may ensure a high level of channel coherence.

Additionally, calibration process 300 may resolve frequency error issues that can arise from clock differences between AP 105-b and the STAs 115. If there is a mismatch between the clocks for AP 105-b and STAs 115, the STAs 115 may make measurements at a different frequency than AP 105-b (e.g., the STA measurements of the downlink will be at a different frequency than the AP measurements of the uplink). Using different frequencies to measure different directions of a channel may complicate the calibration process and decrease its accuracy. Calibration process 300 avoids such frequency mismatch complications because AP 105-b measures downlink channel feedback reports 320 that have been adjusted (as instructed by the trigger message 315) to compensate for the frequency mismatch. For example, as part of the uplink MU-MIMO transmission requirement, STAs 115 may adjust its transmit frequency for the downlink channel feedback reports 320 to be aligned with its receive frequency of the trigger message. Thus, using uplink MU-MIMO transmissions for calibration may enable frequency-pre-correction, which may ensure that the downlink and uplink channel measurements have a small frequency mismatch (e.g., a frequency mismatch within a suitable threshold).

Figure 4:
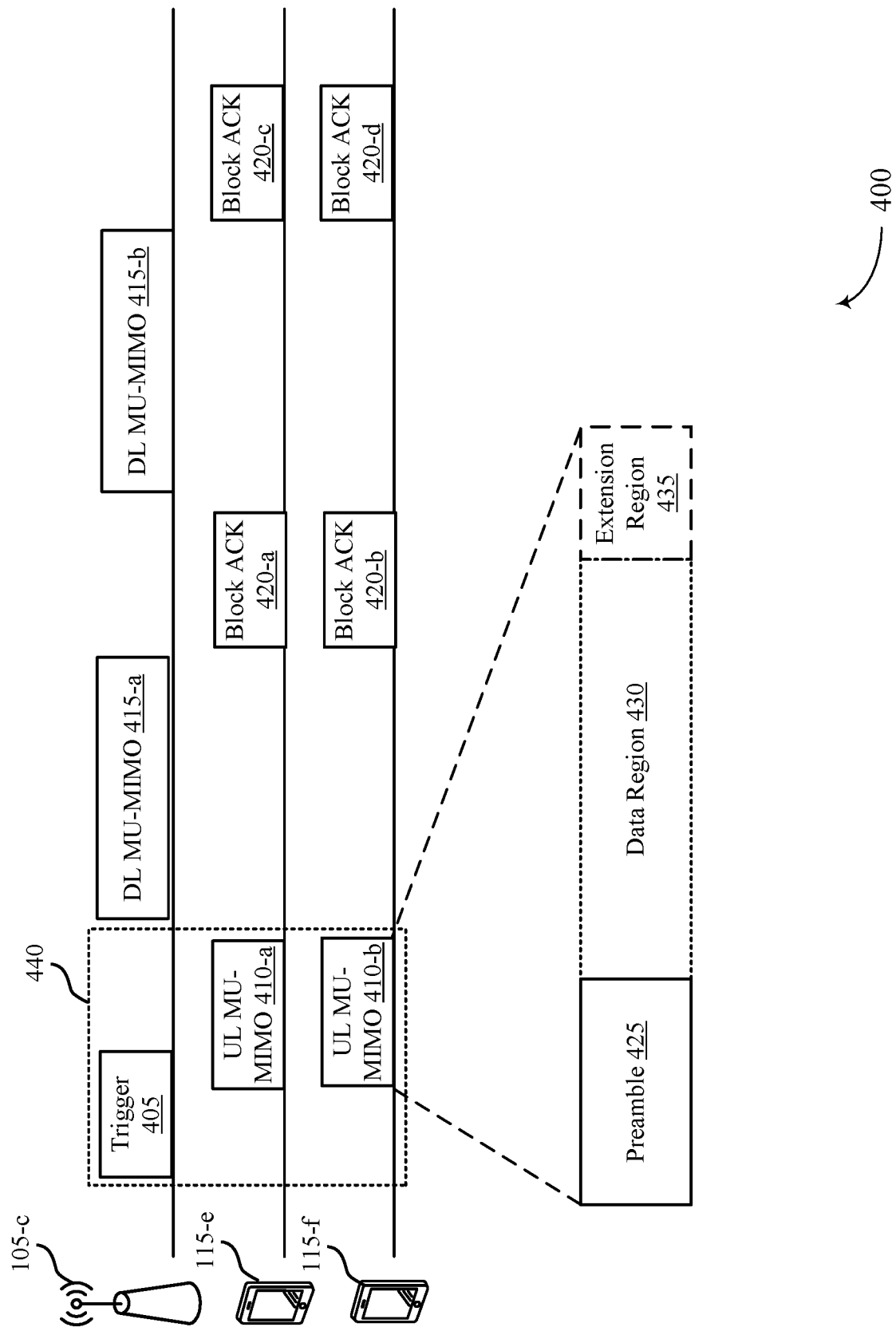
FIG. 4 illustrates an example of an implicit sounding process that uses MU-MIMO transmissions in accordance with aspects of the present disclosure.

FIG. 4 illustrates an example of an implicit sounding process 400 that uses MU-MIMO transmissions. Implicit sounding process 400 may include transmissions by AP 105-c and one or more STAs (e.g., STA 115-e and STA 115-f). Implicit sounding process 400 may occur after completion of a calibration process such as calibration process 300 (e.g., after AP 105-c has generated a reciprocal channel). The STAs 115 may be the same STAs 115 that participated in the calibration process or they may be different STAs 115. Although described with reference to two STAs, the implicit sounding process 400 may be implemented by an AP 105 and any quantity (e.g., any number, one to N) of STAs 115. Although described with reference to a particular combination of wireless devices, the implicit sounding process 400 may be implemented by any combination of wireless devices.

To begin implicit sounding process 400, AP 105-c may transmit a trigger message 405 to STA 115-e and STA 115-f. The trigger message 405 may prompt (e.g., request) an uplink MU-MIMO transmission from one or both of STA 115-e and STA 115-f In some cases, the trigger message 405 may synchronize the uplink MU-MIMO transmissions (e.g., so that they are received at the same time at AP 105-c).

In some cases, the trigger message 405 may include information that ensures an upcoming MU-MIMO transmission has an error vector magnitude (EVM) that satisfies the quality requirements for successful channel estimation. For example, trigger message 405 may include an indication of MCS and target RSSI. The indication of MCS may indicate the MCS each STA 115 is to use for an upcoming uplink MU-MIMO transmission (e.g., the MCS to use for uplink MU-MIMO packets 410). The indication of RSSI may indicate an expected or target RSSI level for an upcoming transmission (e.g., the target RSSI level for uplink MU-MIMO packets 410).

In response to the trigger message 405, STA 115-e and STA 115-f may each perform an uplink MU-MIMO transmission. For example, STA 115-e may transmit uplink MU-MIMO packet 410-a and STA 115-f may transmit uplink MU-MIMO packet 410-b. The preambles 425 of the uplink MU-MIMO packets may include training fields (e.g., LTFs) that enable channel estimation. Although shown as a single packet the uplink MU-MIMO packets 410 may include multiple packets.

In some cases, the uplink MU-MIMO packets 410 are MU-MIMO NDPs (MU-NDPs) that have a payload of zero (e.g., data region 430 may be empty or may not be included). Thus, the uplink MU-MIMO transmissions may be very short (e.g., the length of the preamble). In other cases, the uplink MU-MIMO packets 410 include data in the data region 430. For example, the data region 430 may include downlink information such as SNR, which may assist AP 105-c with data rate selection (e.g., AP 105-c may selection a data rate for upcoming transmissions based on the SNR information included in an uplink MU-MIMO packet 410). Extension portion 435 may optionally be appended to the uplink MU-MIMO packet 410 after data region 430 and may not carry data or other information.

Upon receiving uplink MU-MIMO packets 410, AP 105-c may estimate the uplink channel over which the uplink MU-MIMO packets 410 were received by measuring the preambles 425. For example, the AP 105-c may determine channel characteristics based on measuring the preambles 425, estimate the uplink channel based on the channel characteristics, and compute a beamforming steering matrix and/or pre-coding matrix based on the channel estimation and the correction matrix from the calibration process. Because the OTA channel is reciprocal (e.g., due to the preceding calibration process), AP 105-c is able to use the channel estimation for the uplink as the channel estimation for the downlink. In some cases, AP 105-c may skip the communications in initial phase 440. For example, AP 105-c may estimate the channel (and compute the beamforming and/or matrix) based on downlink channel characteristics obtained from a previous calibration process.

After calculating an initial channel estimate, AP 105-c may transmit a downlink MU-MIMO packet 415-a to the STAs 115. Although shown and described as a single packet, the downlink MU-MIMO packet 415-a may include multiple packets. The downlink MU-MIMO packet 415-a may be precoded based on the uplink channel estimation (e.g., together with the calibration matrix used to generate the precoding/beamforming matrix). The downlink MU-MIMO packet 415-a may include control and/or data information for the STAs 115.

In response to receiving the downlink MU-MIMO packet 415-a, the STAs 115 may each transmit uplink MU-MIMO packets to AP 105-c. The uplink MU-MIMO packets may include data (e.g., the packets may have non-zero payloads such that there is data in the data regions). In some cases, the uplink MU-MIMO packets include block ACKs 420. The block ACKs 420 may indicate the reception status (e.g., success or failure) of downlink data (e.g., downlink data in downlink MU-MIMO packet 415-a) at the STAs 115. In some cases, the block ACKs 420 are represented as a bit map, with each bit in the bit map representing an ACK/NACK for a packet of data.

Upon receiving block ACKs 420-a and block ACKs 420-b, AP 105-c may measure the training fields included in the associated uplink MU-MIMO packets to determine new characteristic information for the uplink channel. Thus, AP 105-c may update its initial estimate of the uplink channel based on the MU-MIMO block ACKs 420. Accordingly, AP 105-c may transmit downlink MU-MIMO packet(s) 415-b based on the updated channel estimate. In some cases, AP 105-c may repeat the channel estimate update process (e.g., update the beamforming and/or precoding matrix) by measuring the training fields of the packets used to convey block ACKs 420-c and block ACKs 420-d.

The STAs 115 that participate in implicit sounding process 400 may (e.g., as instructed by AP 105-c) use the same set of antenna chains to transmit and receive over the channel H. For example, STA 115-e may use a set of antenna chains to receive downlink MU-MIMO packet(s) 415 and the same set of antenna chains to transmit block ACKs 420. STA 115-e may also use the same set of antenna chains to receive trigger message 405 and to transmit uplink MU-MIMO packet(s) 410-a.

Figure 5:
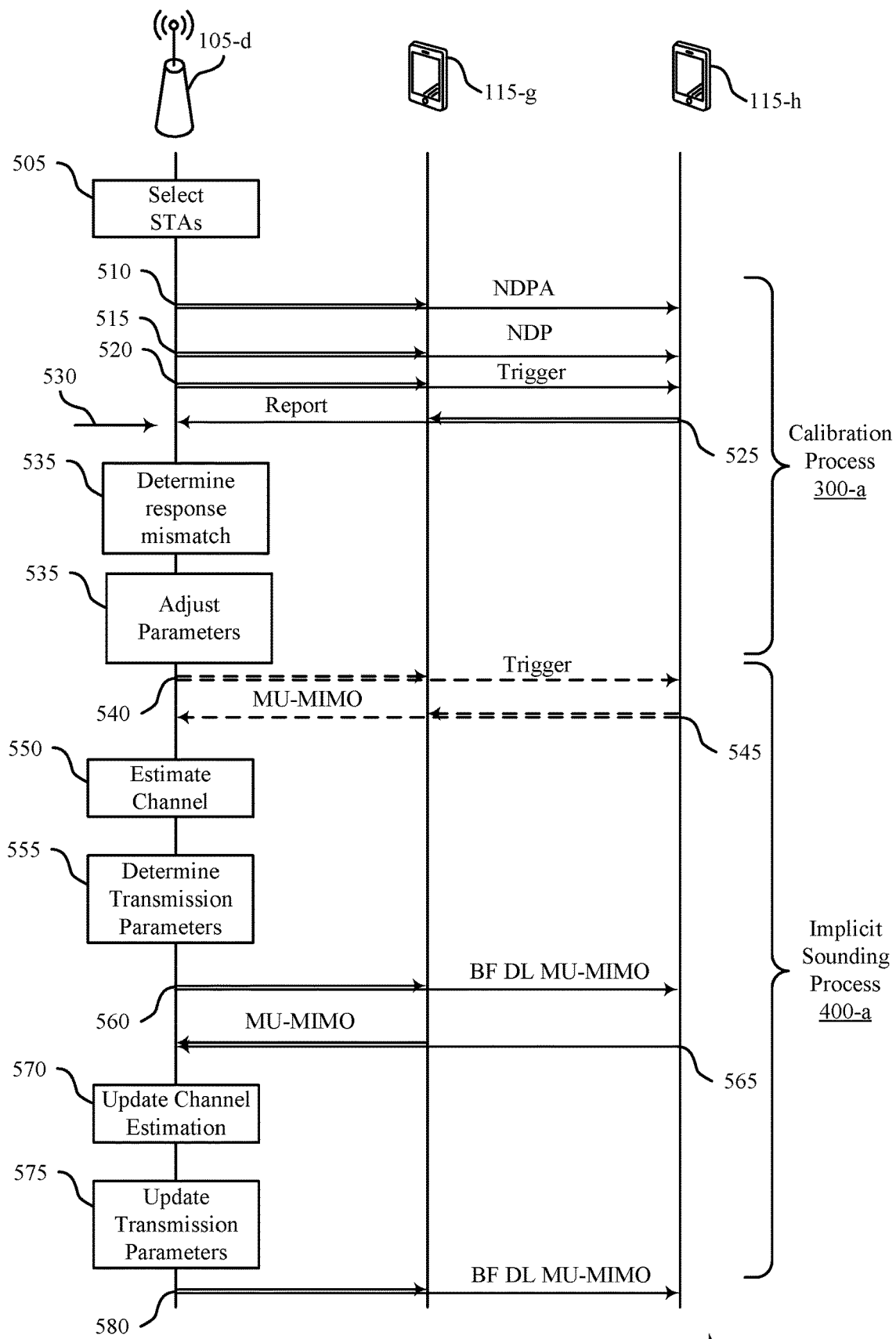
FIG. 5 illustrates an example of MU-MIMO calibration and implicit sounding processes that use MU-MIMO transmissions in accordance with aspects of the present disclosure.

FIG. 5 illustrates an example of MU-MIMO calibration and implicit sounding processes 500. Calibration and implicit sounding processes 500 may include calibration process 300-a, which may be an example or variation of calibration process 300 described with reference to FIG. 3. Calibration and implicit sounding processes 500 may also include implicit sounding process 400-a, which may be an example or variation of implicit sounding process 400 described with reference to FIG. 4. Implicit sounding processes 500 may be performed by an AP 105 (e.g., AP 105-d) and one or more STAs 115 (e.g., STA 115-g and STA 115-h). Although described with reference to two STAs 115, the implicit sounding processes 500 may be implemented by an AP 105 and any quantity (e.g., any number, one to N) of STAs 115. Although described with reference to a particular combination of wireless devices, the calibration and implicit sounding processes 500 may be implemented by any combination of wireless devices.

At 505, AP 105-d may select a set of STAs 115 to participate in calibration process 300-a. In some cases, AP 105-d may select the STAs 115 based on a maximum number of spatial streams supported by the STAs 115 (e.g., as reported by the STAs 115). For example, AP 105-d may select STAs 115 that support at most one spatial stream (and refrain from selecting STAs 115 that support two or more spatial streams). In some cases, AP 105-d may select the STAs 115 based on the whether they are non-legacy STAs. For example, AP 105-d may select STAs 115 that are non-legacy STAs but refrain from selecting STAs 115 that are legacy STAs. A legacy STA may be a STA that is configured to exclude the U matrix from its downlink channel feedback reports. A non-legacy STA may be a STA that is configured to include the U matrix, or the channel response matrix H, in its downlink channel feedback reports.

At 510, AP 105-d may transmit an NDPA to the selected STAs (e.g., to STA 115-g and STA 115-h). The NDPA may indicate that calibration process 300-a has begun. The NDPA may also indicate that STA 115-g and STA 115-h are to participate in the calibration process 300-a. In some cases (e.g., when the selected STAs 115 are legacy STAs), the NDPA may indicate the number of antennas the STAs 115 are to use for the calibration process. The NDPA may also indicate that the antenna(s) used for receiving during the calibration process 300-a are also to be used for transmitting during calibration process 300-a.

At 515, AP 105-d may, based on the NDPA, transmit an NDP to STA 115-g and STA 115-h. At 520, AP 105-d may transmit a trigger message to STA 115-g and STA 115-h. The trigger message may indicate when the STAs 115 are to transmit a report corresponding to the NDP transmitted at 515.

At 525, AP 105-d may receive a report from STA 115-g and a report from STA 115-h. The reports may include measurement information (e.g., information indicative of measurement results) for downlink channels between AP 105-d and the STAs 115. The reports may be examples of downlink channel feedback reports 320 as described with reference to FIG. 3. A report may include S and/or V. In some cases, a report may also include a unitary matrix U associated with the downlink channel. In other cases, a report may include a channel response matrix $H_{DL}$ for the downlink channel. At 530, AP 105-d may determine measurement information for an uplink channel between AP 105-d and the STAs 115. The measurement information may be based on measurements of the preambles of the reports.

Based on the measurement information for the uplink channel and the downlink channel, AP 105-d may, at 535, compute a channel response mismatch between a transmit chain and a receive chain of AP 105-d. In some cases, the channel response mismatch is determined based on the channel response matrix for the downlink $H_{DL}$ and the channel response matrix for the uplink $H_{UL}$. For example, the channel response matrix for the downlink $H_{DL}$ may be based on the downlink measurement information conveyed by the reports, and the channel response matrix for the uplink $H_{UL}$ may be based on uplink measurement information obtained by measuring the reports.

Based on the channel response mismatch, AP 105-d may calculate one or more correction matrices. The correction matrices may be applied to the transmit chain(s) of AP 105-d so that the response(s) of the transmit chain(s) match the response(s) of the receive chain(s). Thus, at 540, AP 105-d may adjust one or more parameters of a transmit chain based at least in part on the channel response matrices $H_{UL}$ and $H_{DL}$. Alternatively, AP 105-d may apply the correction matrix to generate the precoding/beamforming matrix. Upon the completion of calibration process 300-a, AP 105-d may treat the OTA channel as a reciprocal channel (and commence implicit sounding process 400-a).

At 540, AP 105-d may transmit, and STA 115-g and STA 115-h may receive, a trigger message. The trigger message may be an example of a trigger message 405 described with reference to FIG. 4. In some cases, the trigger message may instruct the STAs 115 to perform an uplink MU-MIMO transmission. In some cases, the trigger message may also indicate the MCS the STAs are to use for the uplink MU-MIMO transmission, as well as a target RSSI. In response to the trigger message (and when relevant, according to the indicated MCS and RSSI), the STAs 115 may perform uplink MU-MIMO transmissions at 545. For example, STA 115-g may transmit an uplink MU-MIMO packet and STA 115-h may transmit an uplink MU-MIMO packet. The MU-MIMO packets may be NDPs (e.g., MU-NDPs) or data packets (e.g., packets with non-zero payloads, such as packets that include data in the data region 430). In some cases, AP 105-d may skip 540 and 545 and estimate the uplink channel based on uplink MU-MIMO transmissions that are part of calibration process 300-a.

At 550, AP 105-d may estimate the uplink channel. This estimate may be referred to as the initial uplink channel estimate. The initial uplink channel estimation may be based on the uplink MU-MIMO transmissions from the STAs 115 (e.g., the uplink channel estimation may be based on measurements of the preambles of the uplink MU-MIMO packets, or based on measurements of uplink MU-MIMO packets received during the calibration process 300-a).

At 555 (e.g., after estimating the downlink channel), AP 105-d may determine one or more parameters for an upcoming transmission. For example, AP 105-d may determine a beamforming steering matrix and/or a pre-coding matrix based on the uplink channel estimation. Even though the channel estimation is for the channel direction opposite that of the transmission, the AP 105-d may use the uplink channel estimation and correction matrix obtained from the calibration process to determine the beamforming steering matrix and/or precoding matrix because the OTA channel is reciprocal (due to calibration process 300-a). At 560, AP 105-d may perform a first downlink MU-MIMO transmission that is beamformed according to the initial uplink channel estimation. The downlink transmission may include one or more packets that convey control and/or data information to the STAs 115.

At 565, AP 105-d may receive one or more uplink MU-MIMO transmissions from the STAs 115. In some cases, the uplink MU-MIMO transmissions carry uplink data for AP 105-d (e.g., as scheduled by AP 105-d). In other cases, the MU-MIMO transmissions are block ACKs. The block ACKs may be in response to the downlink MU-MIMO transmission and may indicate whether the data conveyed by the MU-MIMO transmission was successfully decoded. At 570, AP 105-d may update the initial uplink channel estimation based on measurements of the uplink MU-MIMO transmission (e.g., of the block ACKs) received at 565. And at 575, AP 105-d may update one or more transmission parameters based on the uplink channel estimation (e.g., update the beamforming steering matrix or the pre-coding matrix). At 580, AP 105-d may perform a second downlink MU-MIMO transmission it based on the updated uplink channel estimate.

Figure 6:
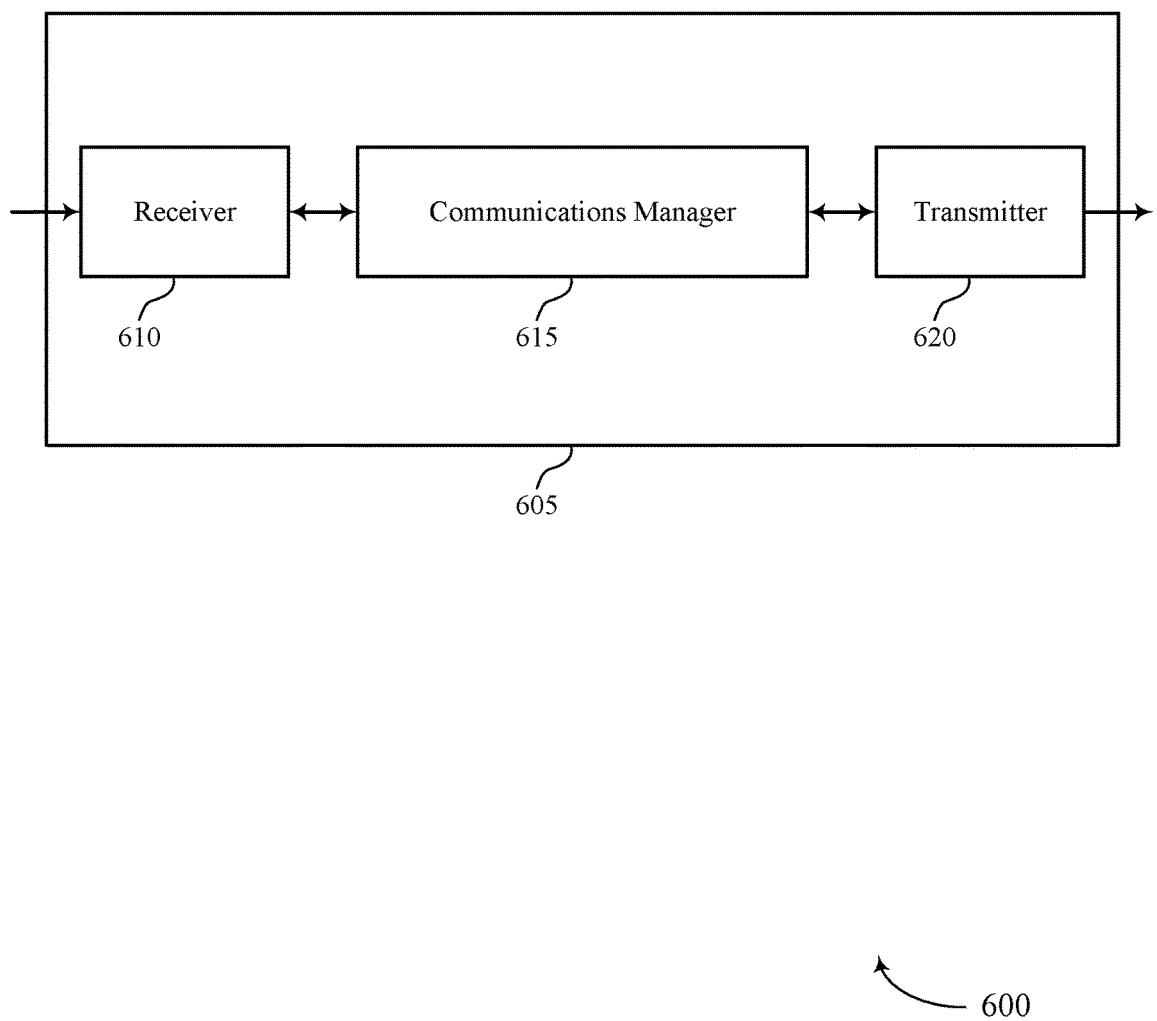
FIGS. 6 and 7 show block diagrams of devices that support calibration and implicit sounding using MU-MIMO transmissions in accordance with aspects of the present disclosure.

FIG. 6 shows a block diagram 600 of a device 605 that supports calibration and implicit sounding using MU-MIMO transmissions in accordance with aspects of the present disclosure. The device 605 may be an example of aspects of an AP 105 or STA 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to calibration and implicit sounding MU-MIMO transmissions, etc.). Information may be passed on to other components of the device. The receiver 610 may be an example of aspects of the transceiver 920 described with reference to FIG. 9. The receiver 610 may utilize a single antenna or a set of antennas.

The communications manager 615 facilitate the performance of calibration and implicit sounding processes. For example, as part of an implicit sounding process, the communications manager 615 may transmit a trigger message to a set of wireless devices, the trigger message prompting at least a first MU-MIMO transmission from the set of wireless devices. The communications manager 615 may also receive the first MU-MIMO transmission from the set of wireless devices in response to the trigger message. The communications manager 615 may also perform a second MU-MIMO transmission to the set of wireless devices. The second MU-MIMO transmission may be beamformed and/or pre-coded according to a channel estimate that is based on the first MU-MIMO transmission. The communications manager 615 may then update the channel estimate based at least in part on at least a third MU-MIMO transmission received after the second MU-MIMO transmission. The communications manager 615 may perform a fourth MU-MIMO transmission to the set of wireless devices based on the updated channel estimate.

As part of a calibration process (e.g., a calibration process that occurs before the implicit sounding process), the communications manager 615 may transmit an NDPA to a set of wireless devices (e.g., the same or different set of wireless devices used in the sounding process). The NDPA may include an indication of the quantity (e.g., number, one to N) of transmit and receive chains the set of wireless devices is to use for the calibration process with the device 605. The communications manager 615 may transmit an NDP to the set of wireless devices based on the NDPA, and receive, in response to the NDP, at least one report from the set of wireless devices. The at least one report may include measurement information for a first channel between the device 605 and a second wireless device in the set of wireless devices. The communications manager 615 may determine measurement information for a second channel between the device 605 and the second wireless device based on a preamble of the report. The communications manager 615 may compute a channel response mismatch between a transmit chain and a receive chain of the device 605 based on the measurement information for the first channel and the measurement information for the second channel. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 615, or its sub-components may be implemented by a wireless modem. The wireless modem may be coupled to the receiver 610 over a first interface and coupled to the transmitter 620 over a second interface. In some examples, the wireless modem may obtain messages and signaling received at the receiver 610 over the first interface. In other examples, the wireless modem may output messages or signaling for transmission by the transmitter 620 over the second interface.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of multiple antennas.

Figure 7:
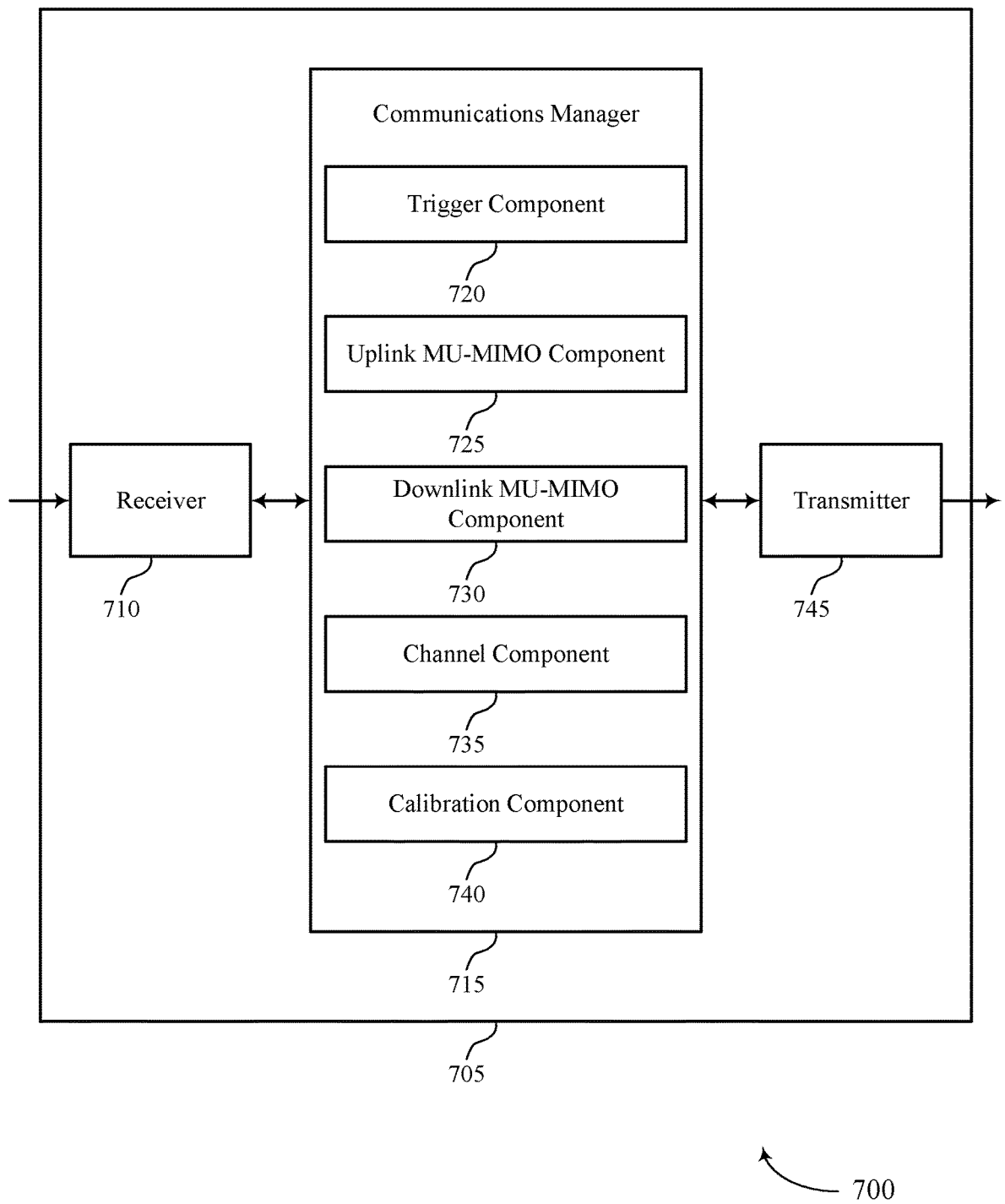

FIG. 7 shows a block diagram 700 of a device 705 that supports calibration and implicit sounding using multi-user multiple input multiple output transmissions in accordance with aspects of the present disclosure. The device 705 may be an example of aspects of a device 605, an AP 105, or a STA 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to calibration and implicit sounding using MU-MIMO transmissions, etc.). Information may be passed on to other components of the device. The receiver 710 may be an example of aspects of the transceiver 920 described with reference to FIG. 9. The receiver 710 may utilize a single antenna or a set of multiple antennas.

The communications manager 715 may be an example of aspects of the communications manager 615 as described herein. The communications manager 715 may include a trigger component 720, an uplink MU-MIMO component 725, a downlink MU-MIMO component 730, a channel component 735, and a calibration component 740. The communications manager 715 may be an example of aspects of the communications manager 910 described herein.

The trigger component 720 may (e.g., during a sounding process) transmit a trigger message to a set of wireless devices. The trigger message may prompt a first MU-MIMO transmission from the set of wireless devices.

The uplink MU-MIMO component 725 may (e.g., during a sounding process) receive the first MU-MIMO transmission from the set of wireless devices in response to the trigger message.

The downlink MU-MIMO component 730 may (e.g., during a sounding process) perform a second MU-MIMO transmission to the set of wireless devices. The second MU-MIMO transmission may be beamformed according to a channel estimate that is based on the first MU-MIMO transmission. The downlink MU-MIMO component 730 may also perform a third downlink MU-MIMO transmission to the set of wireless devices based on an updated channel estimate (e.g., as provided by the channel component 735).

The channel component 735 may (e.g., during a sounding process) update the channel estimate based on at least a third MU-MIMO transmission received after the second MU-MIMO transmission. The downlink MU-MIMO component 730 may perform a fourth MU-MIMO transmission to the plurality of wireless devices based at least in part on the updated channel estimate.

The calibration component 740 may (e.g., during a calibration process) transmit an NDPA to a set of wireless devices. The NDPA may include an indication of a quantity (e.g., number, one to N) of transmit and receive chains the set of wireless devices is to use for a calibration process with the AP. The calibration component 740 may (e.g., during a calibration process) transmit a null data packet (NDP) to the set of wireless devices based on the NDPA.

The uplink MU-MIMO component 725 may (e.g., during a calibration process) receive, in response to the NDP, at least one report from the set of wireless devices. The at least one report may include measurement information for a first channel between the device 705 and a second wireless device in the set of wireless devices.

The channel component 735 may (e.g., during a calibration process) determine measurement information for a second channel between the device 705 and the at least one wireless device based on a preamble of the report. The channel component 735 may (e.g., during a calibration process) compute a channel response mismatch between a transmit chain and a receive chain of the device 705 based on the measurement information for the first channel and based on the measurement information for the second channel.

The transmitter 745 may transmit signals generated by other components of the device. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
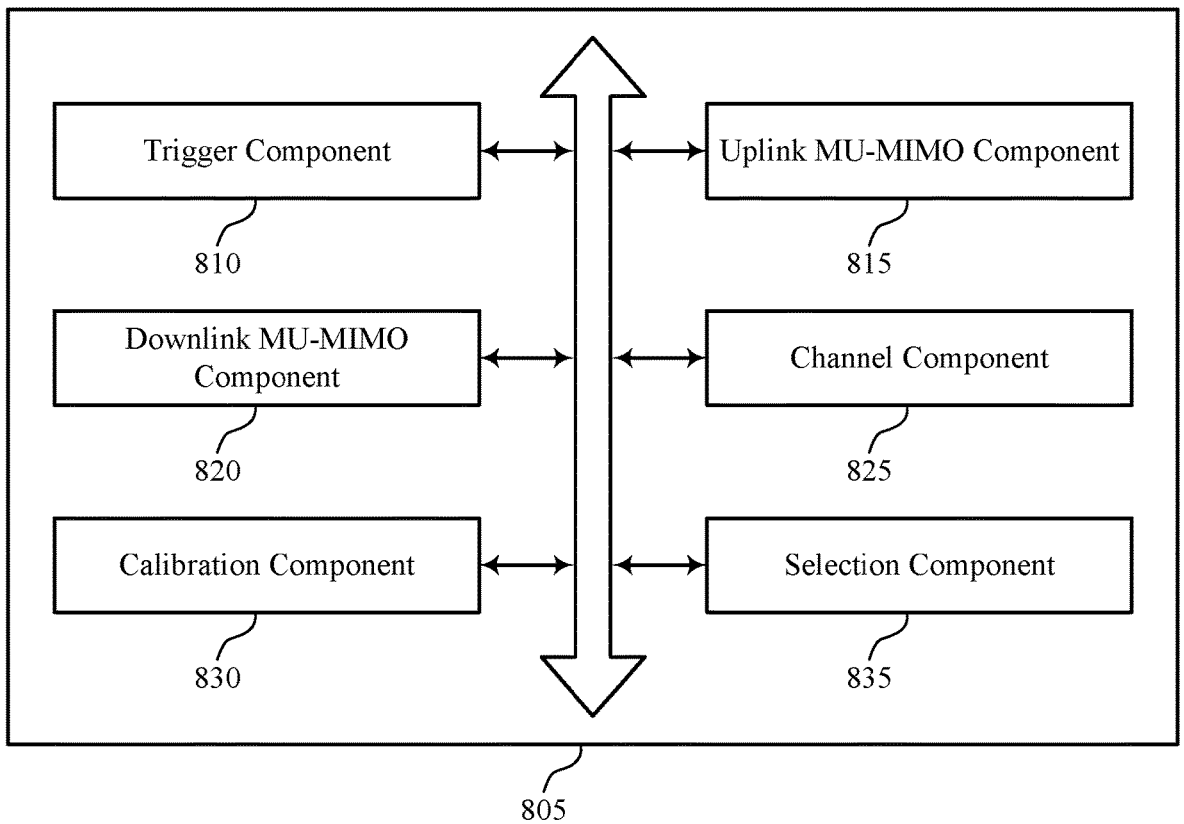
FIG. 8 shows a block diagram of a communications manager that supports calibration and implicit sounding using MU-MIMO transmissions in accordance with aspects of the present disclosure.

FIG. 8 shows a block diagram 800 of a communications manager 805 that supports calibration and implicit sounding using MU-MIMO transmissions in accordance with aspects of the present disclosure. The communications manager 805 may be an example of aspects of a communications manager 615, a communications manager 715, an AP 105, or a STA 115 described herein. The communications manager 805 may include a trigger component 810, an uplink MU-MIMO component 815, a downlink MU-MIMO component 820, a channel component 825, a calibration component 830, and a selection component 835. Each of these modules may communicate, directly or indirectly, with one another (e.g., via one or more buses).

The trigger component 810 may (e.g., during a sounding process) transmit a trigger message to a set of wireless devices, the trigger message prompting at least a first MU-MIMO transmission from the set of wireless devices. In some examples, the trigger component 810 may (e.g., during a sounding process) transmit, to the at least one wireless device, a trigger message indicating when to send the at least one report and indicating that the at least one wireless device is to send the at least one report using uplink MU-MIMO. In some cases, the trigger message includes an indication of an MCS the set of wireless devices is to use and a target RSSI.

The uplink MU-MIMO component 815 may (e.g., during a sounding process) receive the first MU-MIMO transmission from the set of wireless devices in response to the trigger message. The first MU-MIMO transmission may be an NDP or a packet with a payload that includes downlink channel information. In some examples (e.g., during a calibration process), the uplink MU-MIMO component 815 may receive, in response to an NDP, at least one report from the set of wireless devices. The at least one report may include measurement information for a downlink channel between an AP 105 and at least one wireless device in the set of wireless devices.

The uplink MU-MIMO component 815 may (e.g., during a sounding process) receive a first MU-MIMO block ACK for the second MU-MIMO transmission. In some examples (e.g., during a sounding process), the uplink MU-MIMO component 815 may receive a second MU-MIMO block ACK for the second MU-MIMO message. The first and second MU-MIMO block ACKs may be received from different wireless devices of the set of wireless devices.

In some examples (e.g., during a sounding process), the uplink MU-MIMO component 815 may receive a first uplink MU-MIMO transmission from a first wireless device of the set of wireless devices. In some examples (e.g., during a sounding process), the uplink MU-MIMO component 815 may receive a fifth uplink MU-MIMO transmission from a second wireless device of the set of wireless devices. The trigger message sent by the trigger component 810 may synchronize the first and fifth uplink MU-MIMO transmissions so that they overlap at least partially in time. In some examples (e.g., during a sounding process), the uplink MU-MIMO component 815 may estimate the channel based on the first MU-MIMO transmission and the fifth MU-MIMO transmission.

The downlink MU-MIMO component 820 may (e.g., during a sounding process) perform a second MU-MIMO transmission to the set of wireless devices. The second MU-MIMO transmission may be beamformed and/or precoded according to a channel estimation that is based on the first MU-MIMO transmission. In some examples (e.g., during a sounding process), the downlink MU-MIMO component 820 may perform a fourth downlink MU-MIMO transmission to the set of wireless devices based on an updated uplink channel estimate (e.g., as provided by the channel component 825).

The channel component 825 may (e.g., during a sounding process) update the uplink channel estimate based on at least a third MU-MIMO transmission received after the second MU-MIMO transmission. The channel component 825 may (e.g., during a sounding process) update the uplink channel estimate based on at least a first MU-MIMO block ACK received for the second MU-MIMO transmission. In some examples (e.g., during a calibration process), the channel component 825 may determine measurement information for an uplink channel between the device and the second wireless device based on a preamble of the report. In some examples (e.g., during a calibration process), the channel component 825 may compute a channel response mismatch between a transmit chain and a receive chain of the device based on the measurement information for the downlink channel and the measurement information for the uplink channel.

In some examples (e.g., during a sounding process), the channel component 825 may measure a preamble of a MU-MIMO packet including the block ACK, where the channel estimate is updated based on the measurement. In some examples (e.g., during a sounding process), the channel component 825 may update the uplink channel estimate based on a MU-MIMO block ACK.

In some examples (e.g., during a calibration process), the channel component 825 may compute a channel response matrix for the uplink channel based on the measurement information for the uplink channel. In some examples (e.g., during a calibration process), the channel component 825 may compute a channel response matrix for the downlink channel based on the measurement information for the downlink channel. In some examples (e.g., during a calibration process), the channel component 825 may compute a channel response mismatch between a transmit chain and a receive chain of the device based on the channel response matrices.

The calibration component 830 may (e.g., during a calibration process) transmit an NDPA to a set of wireless devices. The NDPA may include an indication of a quantity (e.g., a number, one to N) of transmit and receive chains the set of wireless devices is to use for a calibration process with the device. For example, the NDPA may indicate the quantity of antennas to use to a) measure a following NDP and to b) send measurement information for the NDP. In some examples (e.g., during a calibration process), the calibration component 830 may transmit an NDP to the set of wireless devices based on the NDPA.

Thus, the calibration component 830 may perform a calibration process with at least one wireless device of the set of wireless devices. The second MU-MIMO transmission from the downlink MU-MIMO component 820 may occur after the calibration process. In some examples, performing the calibration process includes receiving a report from the at least one wireless device. The report may include a unitary matrix U that is associated with a downlink channel. Or the report may include a channel response matrix $H_{DL}$ for the downlink channel. In some examples (e.g., during a calibration process), the calibration component 830 may compute a channel response matrix $H_{DL}$ for the downlink channel based on the unitary matrix U. In some examples (e.g., during a calibration process), the calibration component 830 may adjust one or more parameters of a transmit chain based on the channel response matrix. Thus, the calibration component 830 may adjust one or more parameters of a transmit chain based on the channel response mismatch.

The selection component 835 may (e.g., prior to a calibration process) determine that the at least one wireless device supports a maximum of one spatial stream. In some examples, the selection component 835 may select the at least one wireless device for the calibration process based on the determination. In some examples, the selection component 835 may select the at least one wireless device for the calibration process based on determining that the at least one wireless device is a non-legacy wireless station.

Figure 9:
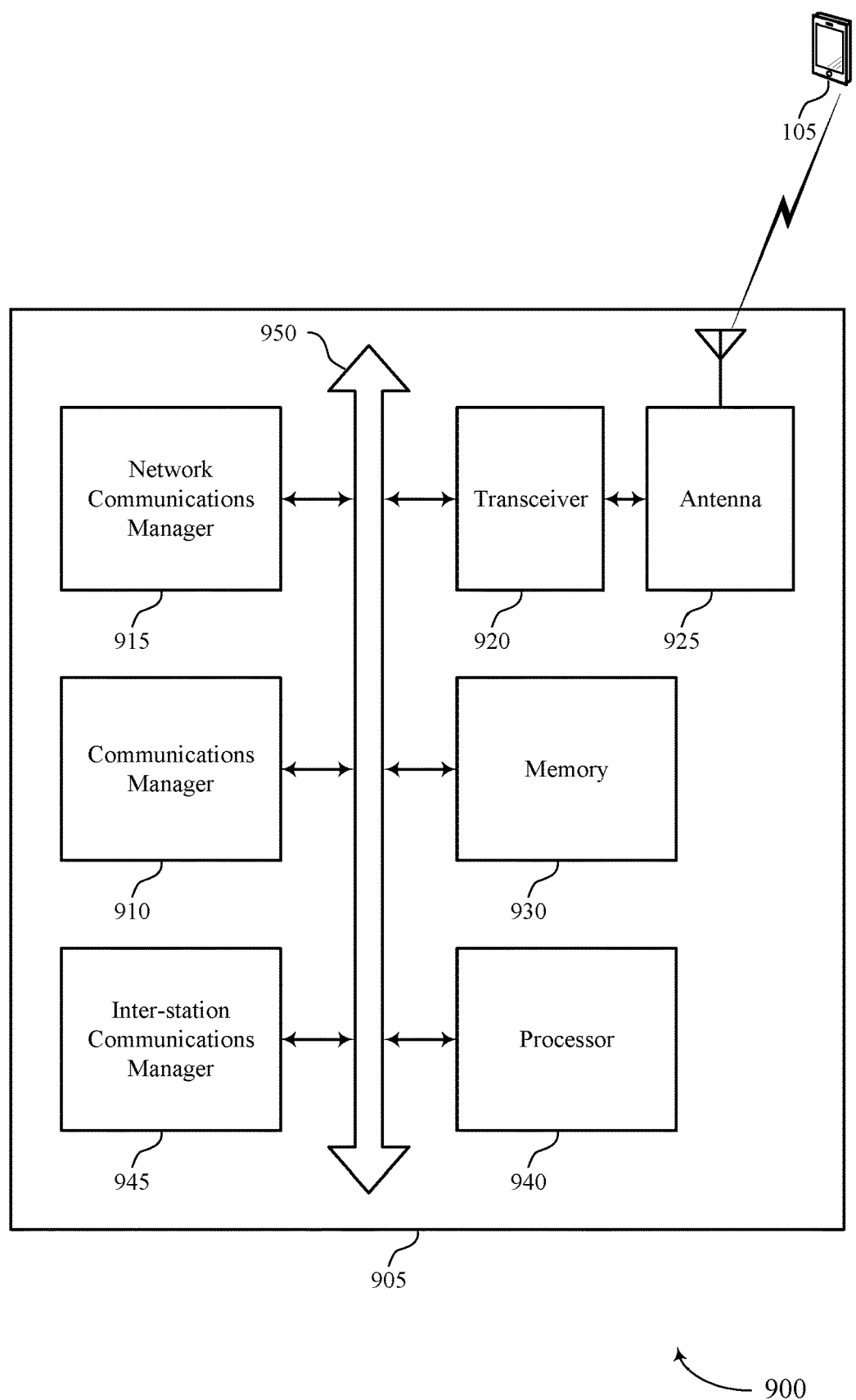
FIG. 9 shows a diagram of a system including a device that supports calibration and implicit sounding using MU-MIMO transmissions in accordance with aspects of the present disclosure.

FIG. 9 shows a diagram of a system 900 including a device 905 that supports calibration and implicit sounding using MU-MIMO transmissions in accordance with aspects of the present disclosure. The device 905 may be an example of or include the components of device 605, device 705, an AP 105, or a STA 115 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 950).

During a sounding process, the communications manager 910 may transmit a trigger message to a set of wireless devices. The trigger message may prompt a first MU-MIMO transmission from the set of wireless devices. The communications manager 910 may receive the first MU-MIMO transmission from the set of wireless devices in response to the trigger message. The communications manager 910 may perform a second MU-MIMO transmission to the set of wireless devices. The second MU-MIMO transmission may be beamformed and/or precoded according to a channel estimation that is based on first MU-MIMO transmission. The communications manager may update the channel estimate based on at least a third MU-MIMO transmission received after the second MU-MIMO transmission. The communications manager 910 may perform a fourth MU-MIMO transmission to the set of wireless devices based on the updated channel estimate.

During a calibration process, the communications manager 910 may transmit an NDPA to a set of wireless devices. The NDPA may include an indication of a number of transmit and receive chains the set of wireless devices is to use for a calibration process with the device 905. The communications manager 910 may transmit an NDP to the set of wireless devices based on the NDPA. The communications manager may receive, in response to the NDP, at least one report from the set of wireless devices. The at least one report may include measurement information for a downlink channel between the device 905 and a second wireless device in the set of wireless devices. The communications manager 910 may determine measurement information for an uplink channel between the device 905 and the at least one wireless device based on a preamble of the report. The communications manager 910 may compute a channel response mismatch between a transmit chain and a receive chain of the device 905 based on the measurement information for the downlink channel and the measurement information for the uplink channel.

The network communications manager 915 may manage communications with the core network (e.g., via one or more wired backhaul links). For example, the network communications manager 915 may manage the transfer of data communications for client devices, such as one or more APs 105 or STAs 115.

The transceiver 920 may communicate bi-directionally, via one or more antennas, wired, or wireless links as described herein For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions (e.g., MU-MIMO transmissions).

The memory 930 may include RAM and ROM. The memory 930 may store computer-readable, computer-executable code including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into processor 940. The processor 940 may be configured to execute computer-readable instructions stored in a memory to perform various functions (e.g., functions or tasks supporting calibration and implicit sounding using multi-user multiple input multiple output transmissions).

The inter-station communications manager 945 may manage communications with other APs 105 and may include a controller or scheduler for controlling communications with STAs 115 in cooperation with other APs 105. For example, the inter-station communications manager 945 may coordinate scheduling for transmissions to STAs 115 for various interference mitigation techniques such as beamforming or joint transmission. In some examples, the inter-station communications manager 945 may provide an X2 interface within an LTE/LTE-A wireless communication network technology to provide communication between APs 105.

Figure 10:
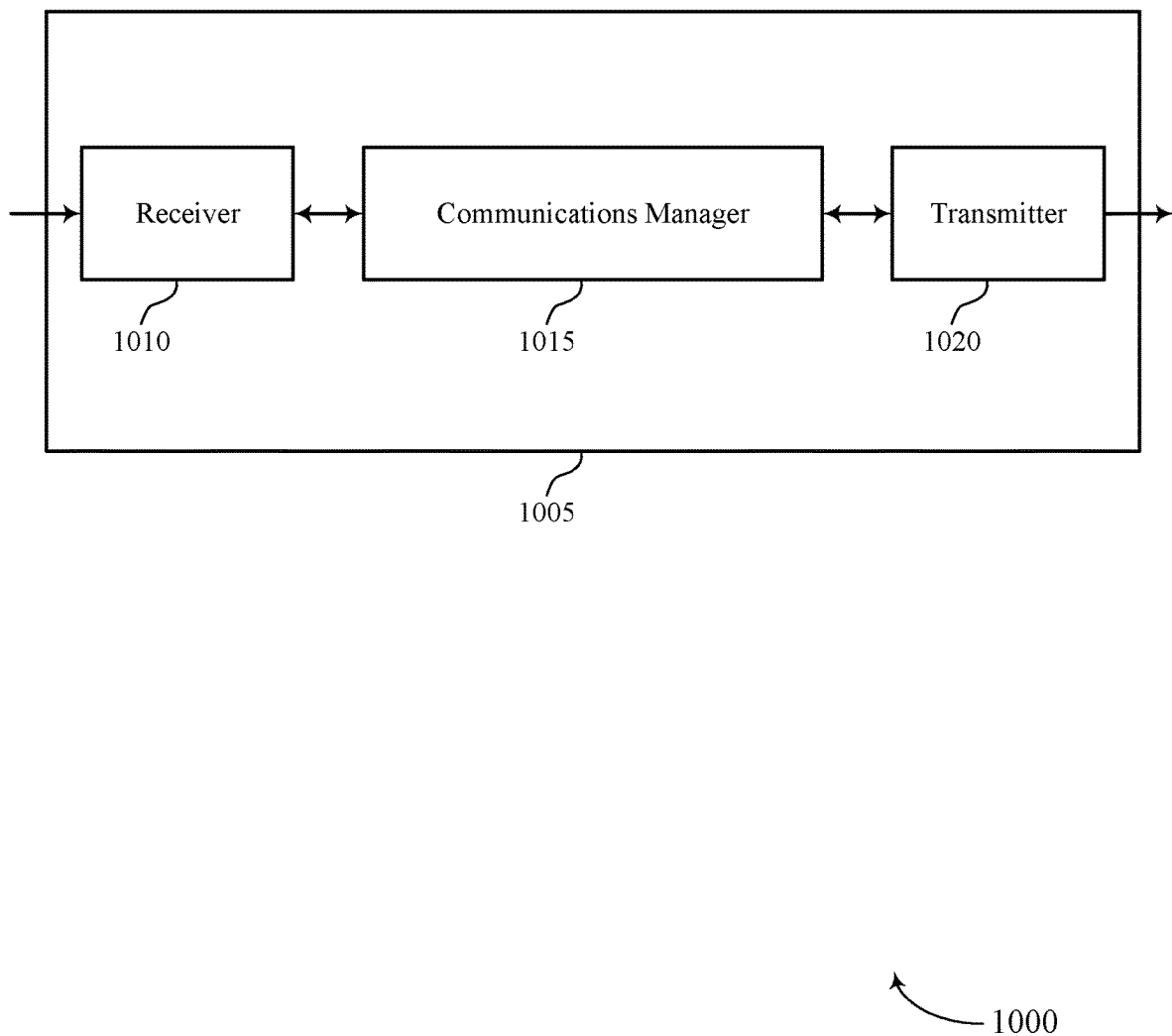
FIG. 10 shows a block diagram of a device that supports calibration and implicit sounding using MU-MIMO transmissions in accordance with aspects of the present disclosure.

FIG. 10 shows a block diagram 1000 of a device 1005 that supports calibration and implicit sounding using MU-MIMO transmissions in accordance with aspects of the present disclosure. The device 1005 may be an example of aspects of an AP 105 or a STA 115 as described herein. The device 1005 may include a receiver 1010, a communications manager 1015, and a transmitter 1020. The device 1005 may also include a processor. Each of these components may be in communication with one another (e.g., via one or more buses).

Receiver 1010 may receive information such as packets, user data, or control information associated with various information channels (e.g., control channels, data channels, and information related to calibration and implicit sounding using MU-MIMO transmissions, etc.). Information may be passed on to other components of the device. The receiver 1010 may be an example of aspects of the transceiver 1020 described with reference to FIG. 10. The receiver 1010 may use a single antenna or a set of antennas.

The communications manager 1015 may receive an NDPA from a wireless device. The NDPA may include an indication of a quantity (e.g., a number, one to N) of chains the device 1005 is to use for a calibration process with the wireless device. The communications manager 1015 may receive an NDP using a set of chains based on the quantity of chains indicated in the NDPA (e.g., the set of chains may include a number of chains that is equal to the quantity indicated in the NDPA). The communications manager 1015 transmit, using the same set of chains, a report including measurement information for a channel between the device 1005 and the wireless device. The communications manager 1015 may be an example of aspects of the communications manager 1210 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The communications manager 1015, or its sub-components, may be implemented by a wireless modem. The wireless modem may be coupled to the receiver 1010 over a first interface and coupled to the transmitter 1020 over a second interface. In some examples, the wireless modem may obtain messages and signaling received at the receiver 1010 over the first interface. In other examples, the wireless modem may output messages or signaling for transmission by the transmitter 1020 over the second interface.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1220 described with reference to FIG. 12. The transmitter 1020 may utilize a single antenna or a set of multiple antennas.

Figure 11:
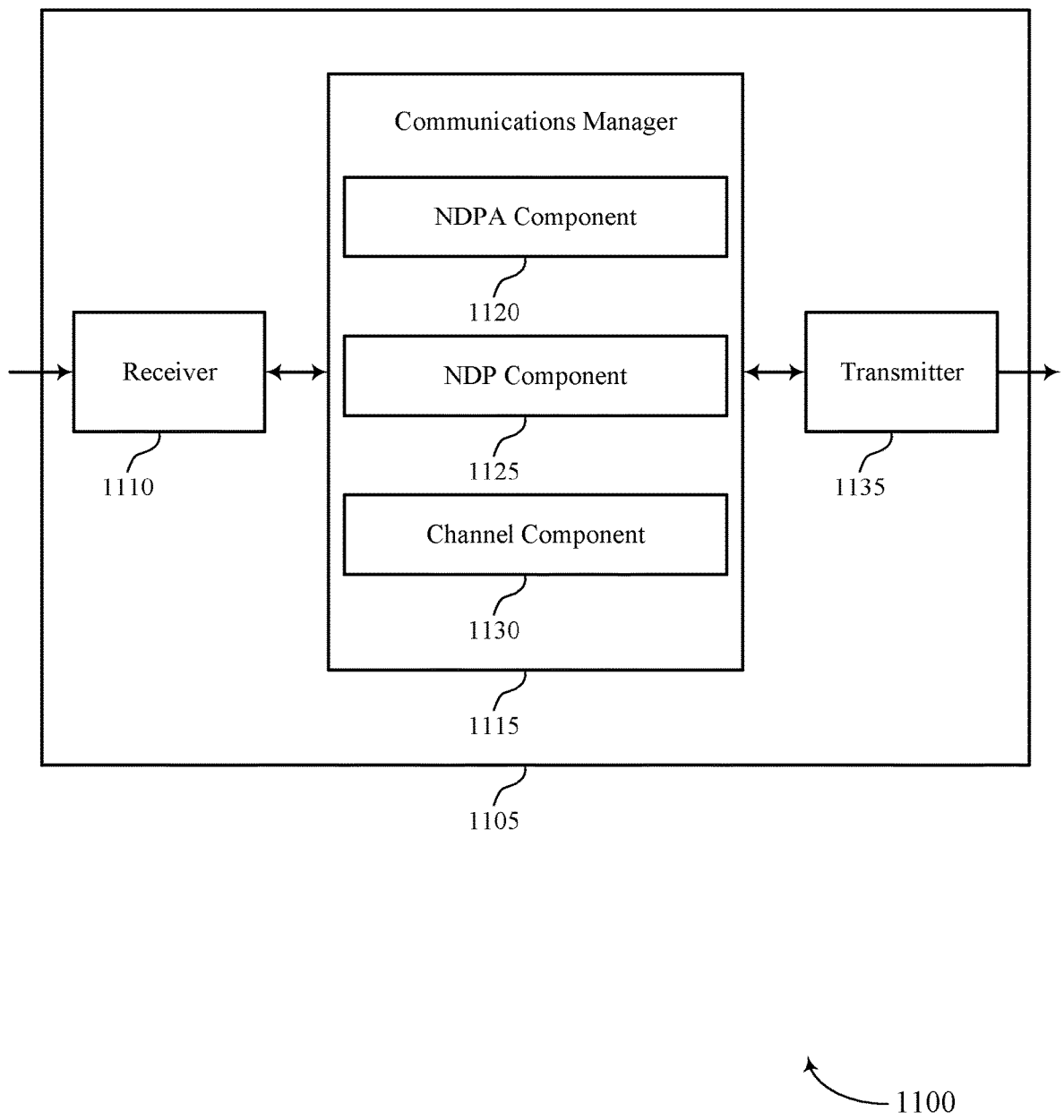
FIG. 11 shows a block diagram of a communications manager that supports calibration and implicit sounding using MU-MIMO transmissions in accordance with aspects of the present disclosure.

FIG. 11 shows a block diagram 1100 of a device 1105 that supports calibration and implicit sounding using MU-MIMO transmissions in accordance with aspects of the present disclosure. The device 1105 may be an example of aspects of a device 1005, an AP 105, or a STA 115 as described herein. The device 1105 may include a receiver 1110, a communications manager 1115, and a transmitter 1135. The device 1105 may also include a processor. Each of these components may be in communication with one another (e.g., via one or more buses).

Receiver 1110 may receive information such as packets, user data, or control information associated with various information channels (e.g., control channels, data channels, and information related to calibration and implicit sounding MU-MIMO transmissions, etc.). Information may be passed on to other components of the device. The receiver 1110 may be an example of aspects of the transceiver 1220 described with reference to FIG. 12. The receiver 1110 may utilize a single antenna or a set of multiple antennas.

The communications manager 1115 may be an example of aspects of the communications manager 1015 as described herein. The communications manager 1115 may include an NDPA component 1120, an NDP component 1125, and a channel component 1130. The communications manager 1115 may be an example of aspects of the communications manager 1210 described herein.

The NDPA component 1120 may receive an NDPA from a wireless device. The NDPA may include an indication of a number of chains the device 1105 is to use for a calibration process with the wireless device. In some cases, the number of chains is one.

The NDP component 1125 may receive an NDP using a set of chains based on the number of chains indicated in the NDPA.

The channel component 1130 may transmit, using the set of chains, a report including measurement information for a channel between device 1105 and the wireless device. In some examples, the channel component 1130 may receive a trigger message indicating when to send the report and indicating that the device 1105 is to send the report using MU-MIMO. In some examples, the channel component 1130 may transmit the report using MU-MIMO based on the trigger message. In some examples, the channel component 1130 may determine a unitary matrix U associated with the channel. In such cases, the report may include the unitary matrix U. In some examples, the channel component 1130 may compute a channel response matrix $H_{DL}$ for the channel. In such cases, the report may include the channel response matrix $H_{DL}$.

Transmitter 1135 may transmit signals generated by other components of the device. In some examples, the transmitter 1135 may be collocated with a receiver 1110 in a transceiver module. For example, the transmitter 1135 may be an example of aspects of the transceiver 1220 described with reference to FIG. 12. The transmitter 1135 may utilize a single antenna or a set of antennas.

Figure 12:
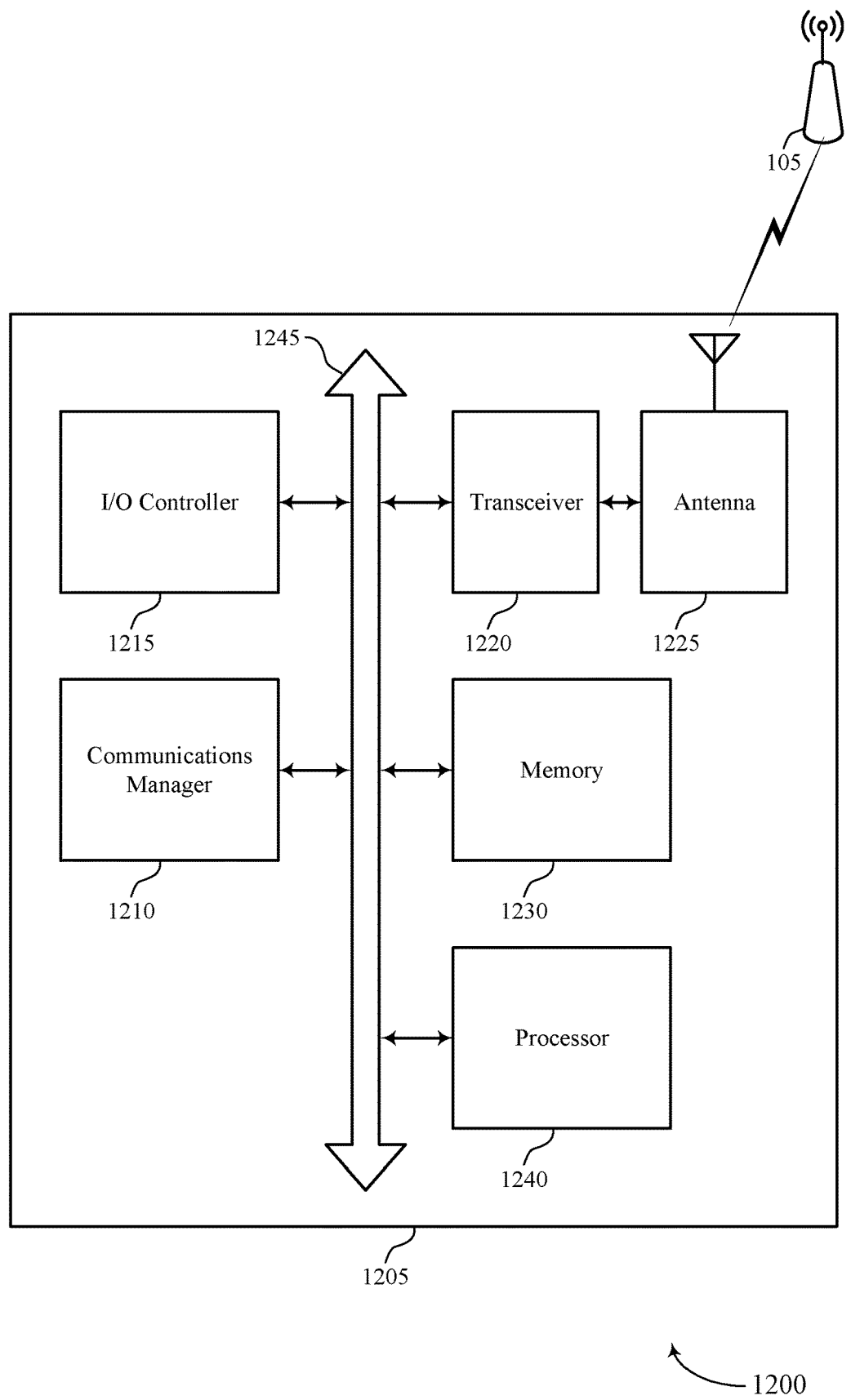
FIG. 12 shows a diagram of a system including a device that supports calibration and implicit sounding using MU-MIMO transmissions in accordance with aspects of the present disclosure.

FIG. 12 shows a diagram of a system 1200 including a device 1205 that supports calibration and implicit sounding using MU-MIMO transmissions in accordance with aspects of the present disclosure. The device 1205 may be an example of or include the components of device 1105, an AP 105, or a STA 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive an NDPA from a wireless device. The NDPA may include an indication of a number of chains the device 2105 is to use for a calibration process with the wireless device. The communications manager 1210 may receive an NDP using a set of chains based on the number of chains indicated in the NDPA. The communications manager 1210 may transmit, using the set of chains, a report including measurement information for a channel between device 1205 and the wireless device.

I/O controller 1215 may manage input and output signals for device 1205. I/O controller 1215 may also manage peripherals not integrated into device 1205. In some cases, I/O controller 1215 may represent a physical connection or port to an external peripheral. In some cases, I/O controller 1215 may utilize an operating system such as iOS®, ANDROID®, MS-DOS®, MS-WINDOWS®, OS/2®, UNIX®, LINUX®, or another known operating system. In other cases, I/O controller 1215 may represent or interact with a modem, a keyboard, a mouse, a touchscreen, or a similar device. In some cases, I/O controller 1215 may be implemented as part of a processor. In some cases, a user may interact with device 1205 via I/O controller 1215 or via hardware components controlled by I/O controller 1215.

Transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions (e.g., MU-MIMO transmissions).

Memory 1230 may include RAM and ROM. The memory 1230 may store computer-readable, computer-executable software including instructions that, when executed, cause the processor to perform various functions described herein. In some cases, the memory 1230 may contain, among other things, a BIOS which may control basic hardware or software operation such as the interaction with peripheral components or devices.

Processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1240 may be configured to operate a memory array using a memory controller. In other cases, a memory controller may be integrated into processor 1240. Processor 1240 may be configured to execute computer-readable instructions stored in a memory to perform various functions (e.g., functions or tasks supporting calibration and implicit sounding using multi-user multiple input multiple output transmissions).

Figure 13:
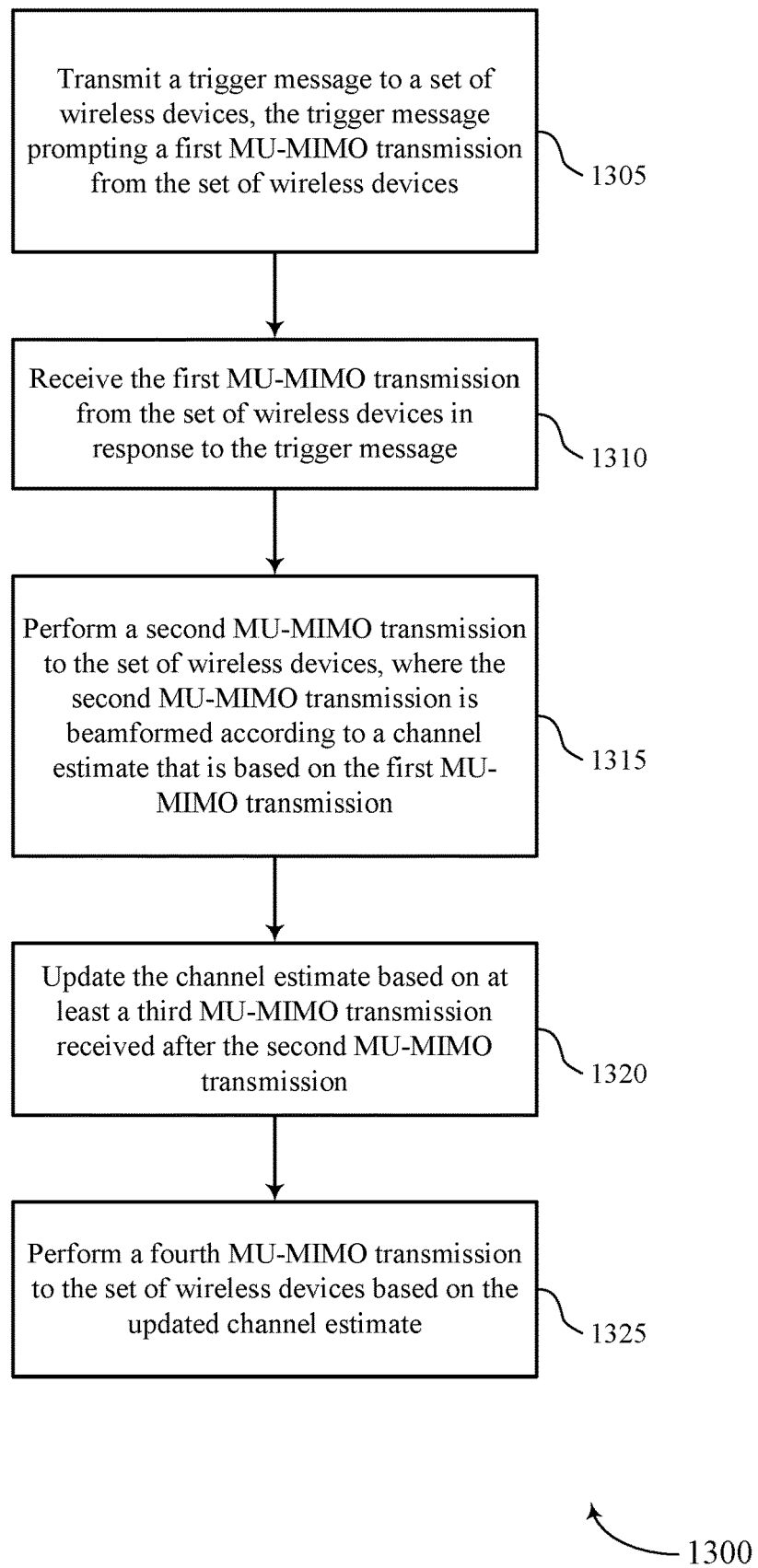
FIGS. 13 through 15 show flowcharts illustrating methods that support calibration and implicit sounding using MU-MIMO transmissions in accordance with aspects of the present disclosure.

FIG. 13 shows a flowchart illustrating a method 1300 that supports calibration and implicit sounding using MU-MIMO transmissions in accordance with aspects of the present disclosure. The operations of method 1300 may be implemented by a wireless device (such as an AP 105 or a STA 115) or its components as described herein. For example, the operations of method 1300 may be performed by a communications manager as described with reference to FIGS. 6 through 9. In some examples, a wireless device may execute a set of instructions to control the functional elements of the wireless device to perform the functions described herein. Additionally, or alternatively, a wireless device may perform aspects of the functions described herein using special-purpose hardware.

At 1305, the wireless device may transmit a trigger message to a set of wireless devices. The trigger message may prompt at least a first MU-MIMO transmission from the set of wireless devices. The operations of 1305 may be performed according to the methods described herein. In some examples, aspects of the operations of 1305 may be performed by a trigger component as described with reference to FIGS. 7 and 8.

At 1310, the wireless device may receive the first MU-MIMO transmission from the set of wireless devices in response to the trigger message. The operations of 1310 may be performed according to the methods described herein. In some examples, aspects of the operations of 1310 may be performed by an uplink MU-MIMO component as described with reference to FIGS. 7 and 8.

At 1315, the wireless device may perform a second MU-MIMO transmission to the set of wireless devices. The second MU-MIMO transmission may be beamformed according to a channel estimate that is based on the first MU-MIMO transmission. The operations of 1315 may be performed according to the methods described herein. In some examples, aspects of the operations of 1315 may be performed by a downlink MU-MIMO component as described with reference to FIGS. 7 and 8.

At 1320, the wireless device may update the channel estimate based on at least a third MU-MIMO transmission received after the second MU-MIMO transmission. The operations of 1320 may be performed according to the methods described herein. In some examples, aspects of the operations of 1320 may be performed by a channel component as described with reference to FIGS. 1 and 8.

At 1325, the wireless device may perform a fourth downlink MU-MIMO transmission to the set of wireless devices based on the updated channel estimate. The operations of 1325 may be performed according to the methods described herein. In some examples, aspects of the operations of 1325 may be performed by a downlink MU-MIMO component as described with reference to FIGS. 7 and 8.

Figure 14:
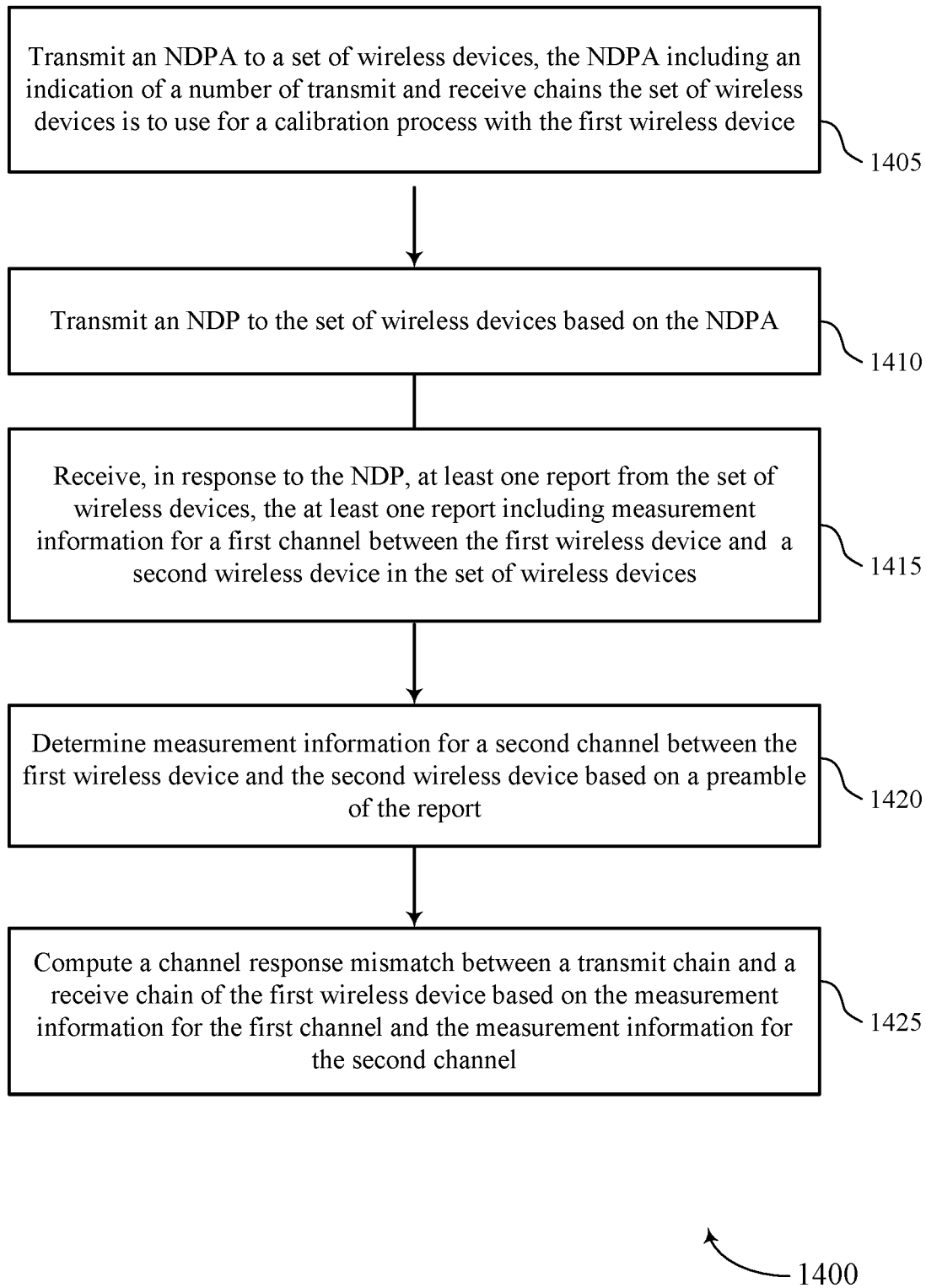

FIG. 14 shows a flowchart illustrating a method 1400 that supports calibration and implicit sounding using MU-MIMO transmissions in accordance with aspects of the present disclosure. The operations of method 1400 may be implemented by a wireless device or its components as described herein. For example, the operations of method 1400 may be performed by a communications manager as described with reference to FIGS. 6 through 9. In some examples, a wireless device may execute a set of instructions to control the functional elements of the wireless device to perform the functions described herein. Additionally, or alternatively, a wireless device may perform aspects of the functions described herein using special-purpose hardware.

At 1405, a first wireless device may transmit an NDPA to a set of wireless devices. The NDPA may include an indication of a number of transmit and receive chains the set of wireless devices is to use for a calibration process with the first wireless device. The operations of 1405 may be performed according to the methods described herein. In some examples, aspects of the operations of 1405 may be performed by a calibration component as described with reference to FIGS. 7 and 8.

At 1410, the first wireless device may transmit an NDP to the set of wireless devices based on the NDPA. The operations of 1410 may be performed according to the methods described herein. In some examples, aspects of the operations of 1410 may be performed by a calibration component as described with reference to FIGS. 7 and 8.

At 1415, the first wireless device may receive, in response to the NDP, at least one report from the set of wireless devices. The at least one report may include measurement information for a first channel between the first wireless device and a second wireless device in the set of wireless devices. The operations of 1415 may be performed according to the methods described herein. In some examples, aspects of the operations of 1415 may be performed by an uplink MU-MIMO component as described with reference to FIGS. 7 and 8.

At 1420, the first wireless device may determine measurement information for a second channel between the first wireless device and the second wireless device based on a preamble of the report. The operations of 1420 may be performed according to the methods described herein. In some examples, aspects of the operations of 1420 may be performed by a channel component as described with reference to FIGS. 7 and 8.

At 1425, the first wireless device may compute a channel response mismatch between a transmit chain and a receive chain of the first wireless device based on the measurement information for the first channel and the measurement information for the second channel. The operations of 1425 may be performed according to the methods described herein. In some examples, aspects of the operations of 1425 may be performed by a channel component as described with reference to FIGS. 7 and 8.

Figure 15:
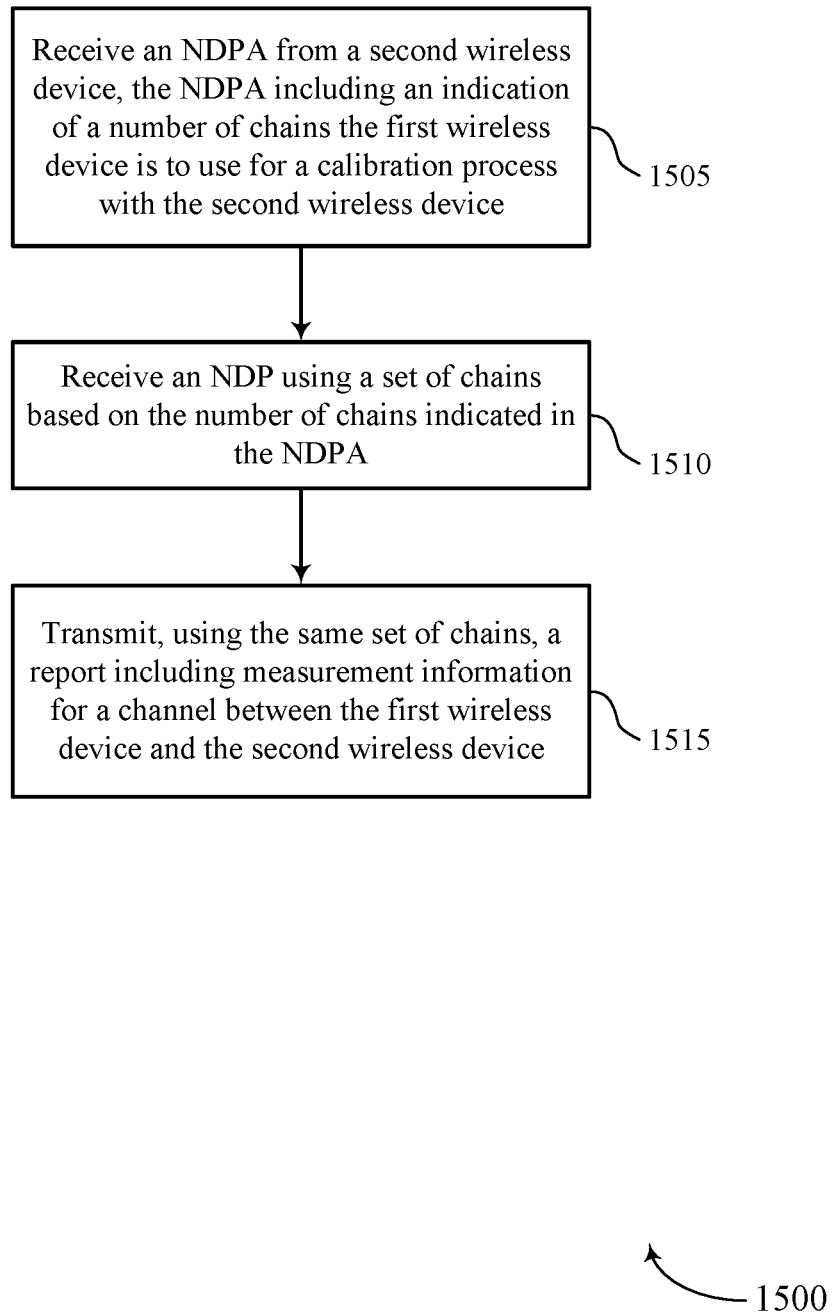

FIG. 15 shows a flowchart illustrating a method 1500 that supports calibration and implicit sounding using MU-MIMO transmissions in accordance with aspects of the present disclosure. The operations of method 1500 may be implemented by a wireless device or its components as described herein. For example, the operations of method 1500 may be performed by a communications manager as described with reference to FIGS. 10 through 12. In some examples, a wireless device may execute a set of instructions to control the functional elements of the wireless device to perform the functions described herein. Additionally, or alternatively, a wireless device may perform aspects of the functions described herein using special-purpose hardware.

At 1505, a first wireless device may receive an NDPA from a second wireless device. The NDPA may include an indication of a number of chains the first wireless device is to use for a calibration process with the second wireless device. The operations of 1505 may be performed according to the methods described herein. In some examples, aspects of the operations of 1505 may be performed by a NDPA component as described with reference to FIG. 11.

At 1510, the first wireless device may receive an NDP using a set of chains based on the number of chains indicated in the NDPA. The operations of 1510 may be performed according to the methods described herein. In some examples, aspects of the operations of 1510 may be performed by an NDP component as described with reference to FIG. 11.

At 1515, the first wireless device may transmit, using the same set of chains, a report including measurement information for a channel between the first wireless device and the second wireless device. The operations of 1515 may be performed according to the methods described herein. In some examples, aspects of the operations of 1515 may be performed by a channel component as described with reference to FIG. 11.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the devices may have similar frame timing, and transmissions from different devices may be approximately aligned in time. For asynchronous operation, the devices may have different frame timing, and transmissions from different devices may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:
    performing a calibration process with one or more wireless devices of a plurality of wireless devices, the calibration process comprising transmitting, to the one or more wireless devices, a null data packet announcement including an indication of a number of antennas to use to measure a following null data packet (NDP) and to send measurement information for the NDP;
    transmitting a trigger message to the plurality of wireless devices, the trigger message prompting at least a first multi-user multiple input multiple output (MU-MIMO) transmission from the plurality of wireless devices;
    receiving the first MU-MIMO transmission from the plurality of wireless devices in response to the trigger message;
    performing a second MU-MIMO transmission to the plurality of wireless devices, wherein the second MU-MIMO transmission is beamformed according to the calibration process and an estimate of a channel that is in an opposite direction of the second MU-MIMO transmission and that is based at least in part on measuring a packet included in the first MU-MIMO transmission;
    updating the estimate of the channel in the opposite direction of the second MU-MIMO transmission based at least in part on measuring at least a third MU-MIMO transmission comprising a block acknowledgement received for the second MU-MIMO transmission; and
    performing a fourth MU-MIMO transmission to the plurality of wireless devices based at least in part on the updated estimate of the channel.

2. The method of claim 1, further comprising:
    determining that the one or more wireless devices support a maximum of one spatial stream; and
    selecting the one or more wireless devices for the calibration process based at least in part on the determination.

3. The method of claim 1, further comprising:
    selecting the one or more wireless devices for the calibration process based on determining that the one or more wireless devices are non-legacy wireless stations; and wherein performing the calibration process comprises:
        receiving a report from the one or more wireless devices, the report comprising a unitary matrix associated with a downlink channel or a channel response matrix for the downlink channel.

4. The method of claim 3, further comprising:
computing the channel response matrix for the downlink channel based at least in part on the unitary matrix; and
generating a beamforming matrix based at least in part on the channel response matrix for the downlink channel.

5. The method of claim 1, wherein measuring the third MU-MIMO transmission comprises:
measuring a preamble of the block acknowledgement.

6. The method of claim 1, further comprising:
receiving a second MU-MIMO block acknowledgement for the second MU-MIMO transmission, wherein the first and second MU-MIMO block acknowledgements are received from different wireless devices of the plurality of wireless devices; and
updating the estimate of the channel based at least in part on the first and second MU-MIMO block acknowledgments.

7. A wireless device, comprising:
a first interface;
a second interface; and
a wireless modem configured to:
perform a calibration process with one or more wireless devices of a plurality of wireless devices, the calibration process comprising transmitting, to the one or more wireless devices, a null data packet announcement including an indication of a number of antennas to use to measure a following null data packet (NDP) and to send measurement information for the NDP;
output a trigger message over the first interface for transmission to the plurality of wireless devices, the trigger message prompting at least a first multi-user multiple input multiple output (MU-MIMO) transmission from the plurality of wireless devices;
obtain over the second interface the first MU-MIMO transmission received from the plurality of wireless devices in response to the trigger message;
perform a second MU-MIMO transmission to the plurality of wireless devices, wherein the second MU-MIMO transmission is beamformed according to the calibration process and an estimate of a channel that is in an opposite direction of the second MU-MIMO transmission and that is based at least in part on measuring a packet included in the first MU-MIMO transmission;
update the estimate of the channel in the opposite direction of the second MU-MIMO transmission based at least in part on measuring at least a third MU-MIMO transmission comprising a block acknowledgement received for the second MU-MIMO transmission; and
perform a fourth MU-MIMO transmission to the plurality of wireless devices based at least in part on the updated estimate of the channel.

8. The wireless device of claim 7, wherein the wireless modem is further configured to:
determine that the one or more wireless devices support a maximum of one spatial stream; and
select the one or more wireless devices for the calibration process based at least in part on the determination.

9. The wireless device of claim 7, wherein the wireless modem is further configured to:
select the one or more wireless devices for the calibration process based on determining that the one or more wireless devices are non-legacy wireless stations; and
wherein the wireless modem is configured to perform the calibration process by being configured to obtain over the second interface a report received from the second wireless device, the report comprising a unitary matrix associated with a downlink channel or a channel response matrix for the downlink channel.

10. The wireless device of claim 9, wherein the wireless modem is further configured to:
compute the channel response matrix for the downlink channel based at least in part on the unitary matrix; and
generate a beamforming matrix based at least in part on the channel response matrix for the downlink channel.

11. The wireless device of claim 7, wherein the wireless modem is configured to measure the third MU-MIMO transmission by being configured to:
measure a preamble of the block acknowledgement.

12. The wireless device of claim 11, wherein the wireless modem is further configured to:
obtain over the second interface a second MU-MIMO block acknowledgement received for the second MU-MIMO transmission, wherein the first and second MU-MIMO block acknowledgements are received from different wireless devices of the plurality of wireless devices; and
update the estimate of the channel based at least in part on the first and second MU-MIMO block acknowledgments.

13. The wireless device of claim 7, wherein the first MU-MIMO transmission comprises a null data packet (NDP) or a packet with a payload that includes downlink channel information.

14. The wireless device of claim 7, wherein the wireless modem is configured to receive the first MU-MIMO transmission by being configured to:
obtain over the second interface the first MU-MIMO transmission received from a second wireless device of the plurality of wireless devices;
obtain over the second interface a fifth MU-MIMO transmission received from a third wireless device of the plurality of wireless devices, wherein the trigger message synchronizes the first and fifth MU-MIMO transmissions so that they overlap at least partially in time and frequency; and wherein the wireless modem is further configured to:
estimate an uplink channel based at least in part on the first MU-MIMO transmission and the third MU-MIMO transmission.

15. The wireless device of claim 7, wherein the trigger message comprises an indication of a modulation and coding scheme (MCS) the plurality of wireless devices is to use and a target received signal strength indicator (RSSI).

16. A first wireless device for wireless communication, comprising:
a first interface;
a second interface; and
a wireless modem configured to:
output a null data packet announcement (NDPA) over the first interface for transmission to a set of wireless devices, the NDPA comprising an indication of a number of transmit and receive chains the set of wireless devices is to use for a calibration process with the first wireless device;
output a null data packet (NDP) over the first interface for transmission to the set of wireless devices based at least in part on the NDPA;
obtain over the second interface at least one report received from the set of wireless devices in response to the NDP, the at least one report comprising measurement information for a first channel between the first wireless device and a second wireless device in the set of wireless devices;

determine measurement information for a second channel between the first wireless device and the second wireless device based at least in part on a preamble of the at least one report; and compute a channel response mismatch between a transmit chain and a receive chain of the first wireless device based at least in part on the measurement information for the first channel and the measurement information for the second channel.

17. The first wireless device of claim 16, wherein the wireless modem is further configured to:

output a trigger message over the first interface for transmission to the second wireless device, the trigger message indicating when to send the at least one report and indicating that the second wireless device is to send the at least one report using MU-MIMO.

18. The first wireless device of claim 16, wherein the wireless modem is further configured to:

compute a channel response matrix for the second channel based at least in part on the measurement information for the second channel; and compute a channel response matrix for the first channel based at least in part on the measurement information for the first channel.

19. The first wireless device of claim 18, wherein the wireless modem is further configured to:

compute the channel response mismatch between a transmit chain and a receive chain of the first wireless device based at least in part on the channel response matrix for the first channel and the channel response matrix for the second channel; and adjust one or more parameters of a transmit chain based at least in part on the channel response mismatch.

20. A first wireless device, comprising:
a first interface;
a second interface; and
a wireless modem configured to:
obtain over the first interface a null data packet announcement (NDPA) received from a second wireless device, the NDPA comprising an indication of a number of chains the first wireless device is to use for receiving a subsequent downlink null data packet (NDP) as part of a calibration process with the second wireless device;

obtain over the first interface the downlink NDP received using a set of chains that is based at least in part on the number of chains indicated in the NDPA; and output, for transmission over the second interface using the same set of chains, a report comprising measurement information for a channel between the first wireless device and the second wireless device.

21. The first wireless device of claim 20, wherein the number of chains is one.

22. The first wireless device of claim 20, wherein the wireless modem is further configured to:

obtain over the first interface a trigger message indicating when to send the report and indicating that the first wireless device is to send the report using multi-user multiple input multiple output (MU-MIMO); and output over the second interface the report for transmission using MU-MIMO based at least in part on the trigger message.

23. The first wireless device of claim 20, wherein the wireless modem is further configured to:

determine a unitary matrix associated with the channel, wherein the report comprises the unitary matrix.

24. The first wireless device of claim 20, wherein the wireless modem is further configured to:

compute a channel response matrix for the channel, wherein the report comprises the channel response matrix.

* * * * *

UNITED STATES PATENT AND TRADEMARK OFFICE
CERTIFICATE OF CORRECTION

| | | |
|---|---|---|
| PATENT NO. | : 11,108,442 B1 | Page 1 of 1 |
| APPLICATION NO. | : 16/506936 | |
| DATED | : August 31, 2021 | |
| INVENTOR(S) | : Tian et al. | |

It is certified that error appears in the above-identified patent and that said Letters Patent is hereby corrected as shown below:

On the Title Page

Item (54), and in the Specification Column 1 Lines 1-3 Title should read:
CALIBRATION AND IMPLICIT SOUNDING USING MULTI-USER MULTIPLE INPUT MULTIPLE OUTPUT TRANSMISSIONS Signed and Sealed this
Fifth Day of July, 2022

Katherine Kelly Vidal
*Director of the United States Patent and Trademark Office*